US012580800B2

(12) United States Patent
Shattil

(10) Patent No.: US 12,580,800 B2
(45) Date of Patent: Mar. 17, 2026

(54) ORTHOGONAL MULTIPLE ACCESS AND NON-ORTHOGONAL MULTIPLE ACCESS

(71) Applicant: Tybalt, LLC, Boulder, CO (US)

(72) Inventor: Steve Shattil, Cheyenne, WY (US)

(73) Assignee: Tybalt, LLC, Boulder, CO (US)

( * ) Notice: Subject to any disclaimer, the term of this patent is extended or adjusted under 35 U.S.C. 154(b) by 206 days.

(21) Appl. No.: 18/589,420

(22) Filed: Feb. 27, 2024

(65) Prior Publication Data

US 2025/0274323 A1 Aug. 28, 2025

Related U.S. Application Data

(63) Continuation of application No. 17/751,654, filed on May 23, 2022, now Pat. No. 11,917,604, which is a continuation of application No. 16/994,622, filed on Aug. 16, 2020, now Pat. No. 11,343,823, which is a continuation of application No. 16/751,946, filed on Jan. 24, 2020, now Pat. No. 10,880,145.

(60) Provisional application No. 62/796,994, filed on Jan. 25, 2019.

(51) Int. Cl.
H04L 27/26 (2006.01)

(52) U.S. Cl.
CPC ...... *H04L 27/2627* (2013.01); *H04L 27/2607* (2013.01)

(58) Field of Classification Search
CPC ..................... H04L 27/2627; H04L 27/2607
See application file for complete search history.

(56) References Cited

U.S. PATENT DOCUMENTS

| | | |
|---|---|---|
| 6,340,964 B1 | 1/2002 | Nakazawa et al. |
| 7,787,556 B2 | 8/2010 | Zhang et al. |
| 8,090,000 B2 | 1/2012 | Hamamura |
| 8,374,074 B2 | 2/2013 | Liao et al. |

(Continued)

FOREIGN PATENT DOCUMENTS

| | | |
|---|---|---|
| CN | 101622797 A | 1/2010 |
| CN | 103039047 A | 4/2013 |

(Continued)

OTHER PUBLICATIONS

Written Opinion dated Nov. 5, 2018 from corresponding PCT Application No. PCT/US2018/043573.

(Continued)

*Primary Examiner* — Sung S Ahn
(74) *Attorney, Agent, or Firm* — Steven J Shattil

(57) ABSTRACT

A transmitter in a wireless communication network includes a bits-to-symbol mapper that produces a plurality of data symbols; and a waveform modulator that receives a first discrete-time waveform and at least a second discrete-time waveform that comprises a cyclic shift of the first discrete-time waveform; modulates a first one of the plurality of data symbols onto the first discrete-time waveform and modulates a second one of the plurality of second data symbol onto the second discrete-time waveform, to produce a plurality of modulated discrete-time waveforms; and sums the plurality of modulated discrete-time waveforms to produce a modulated discrete-time signal to be transmitted in the network. The first discrete-time waveform and at least the second discrete-time waveform are multicarrier signals.

20 Claims, 16 Drawing Sheets

(56) References Cited

U.S. PATENT DOCUMENTS

| | | | |
|---|---|---|---|
| 8,401,095 | B2 | 3/2013 | Han et al. |
| 8,538,159 | B2 | 9/2013 | Lu |
| 8,677,050 | B2 | 3/2014 | Chen et al. |
| 8,724,721 | B2 | 5/2014 | Soler Garrido |
| 9,015,093 | B1 | 4/2015 | Commons |
| 9,698,888 | B2 | 7/2017 | Ko et al. |
| 10,094,650 | B2 | 10/2018 | Todeschini |
| 10,243,773 | B1 | 3/2019 | Shattil |
| 10,447,520 | B1 | 10/2019 | Shattil |
| 10,505,774 | B1 | 12/2019 | Shattil |
| 10,728,074 | B1 | 7/2020 | Shattil |
| 10,985,961 | B1 | 4/2021 | Shattil |
| 11,032,022 | B1 | 6/2021 | Sen et al. |
| 11,151,445 | B2 | 10/2021 | Fowers et al. |
| 11,196,603 | B2 | 12/2021 | Shattil |
| 2003/0085832 | A1 | 5/2003 | Yu et al. |
| 2004/0178954 | A1 | 9/2004 | Vook et al. |
| 2004/0240535 | A1 | 12/2004 | Verma et al. |
| 2006/0034378 | A1 | 2/2006 | Lindskog et al. |
| 2006/0245346 | A1 | 11/2006 | Bar-Ness et al. |
| 2007/0098099 | A1 | 5/2007 | Gore et al. |
| 2007/0110172 | A1 | 5/2007 | Faulkner et al. |
| 2007/0206686 | A1 | 9/2007 | Vook et al. |
| 2008/0075188 | A1 | 3/2008 | Kowalski et al. |
| 2008/0298335 | A1 | 12/2008 | Lee |
| 2008/0317172 | A1 | 12/2008 | Zhang et al. |
| 2009/0074093 | A1 | 3/2009 | Han et al. |
| 2009/0112551 | A1 | 4/2009 | Hollis |
| 2009/0290800 | A1 | 11/2009 | Lo |
| 2010/0008432 | A1 | 1/2010 | Kim et al. |
| 2010/0157925 | A1 | 6/2010 | Francos |
| 2010/0232413 | A1* | 9/2010 | Dakshinamurthy ......................... H04L 27/2614 370/343 |
| 2011/0012798 | A1 | 1/2011 | Triolo |
| 2011/0105051 | A1 | 5/2011 | Thomas et al. |
| 2011/0107174 | A1 | 5/2011 | Liu et al. |
| 2011/0122930 | A1 | 5/2011 | Al-Naffouri et al. |
| 2011/0150325 | A1 | 6/2011 | Hill |
| 2011/0228863 | A1 | 9/2011 | Papasakellariou et al. |
| 2011/0307424 | A1 | 12/2011 | Jin et al. |
| 2012/0014392 | A1 | 1/2012 | Bhushan et al. |
| 2013/0058432 | A1 | 3/2013 | Futatsugi et al. |
| 2013/0198590 | A1 | 8/2013 | Kim et al. |
| 2013/0304683 | A1 | 11/2013 | Lo |
| 2014/0169501 | A1 | 6/2014 | Nazarathy et al. |
| 2014/0180738 | A1 | 6/2014 | Phillipps et al. |
| 2014/0376652 | A1 | 12/2014 | Sayana et al. |
| 2015/0009971 | A1 | 1/2015 | Han et al. |
| 2015/0092872 | A1 | 4/2015 | Keusgen et al. |
| 2015/0117558 | A1 | 4/2015 | Phillips |
| 2015/0146806 | A1 | 5/2015 | Terry |
| 2015/0227747 | A1 | 8/2015 | Gassi |
| 2016/0034810 | A1 | 2/2016 | Hershey et al. |
| 2016/0094318 | A1 | 3/2016 | Shattil |
| 2016/0142117 | A1 | 5/2016 | Rahman et al. |
| 2016/0198474 | A1 | 7/2016 | Raghavan et al. |
| 2016/0254889 | A1 | 9/2016 | Shattil |
| 2016/0328644 | A1 | 11/2016 | Lin et al. |
| 2016/0344497 | A1 | 11/2016 | Myung et al. |
| 2016/0352012 | A1 | 12/2016 | Foo |
| 2017/0054584 | A1 | 2/2017 | Madaiah et al. |
| 2017/0126454 | A1 | 5/2017 | Hao et al. |
| 2017/0126458 | A1 | 5/2017 | Shattil |
| 2017/0192089 | A1 | 7/2017 | Parker et al. |
| 2017/0228646 | A1 | 8/2017 | O'Connor et al. |
| 2017/0295000 | A1 | 10/2017 | Yoo et al. |
| 2017/0331532 | A1 | 11/2017 | Le-Ngoc |
| 2018/0006692 | A1 | 1/2018 | Noh et al. |
| 2018/0075482 | A1 | 3/2018 | Gierach |
| 2018/0109408 | A1 | 4/2018 | Sandell et al. |
| 2018/0123846 | A1 | 5/2018 | Kibutu et al. |
| 2018/0219590 | A1 | 8/2018 | Matsuda et al. |
| 2018/0262253 | A1 | 9/2018 | Rahman et al. |
| 2018/0278303 | A1 | 9/2018 | Hong et al. |
| 2018/0309599 | A1 | 10/2018 | Lee |
| 2018/0332573 | A1 | 11/2018 | Yu et al. |
| 2019/0132177 | A1 | 5/2019 | Wang et al. |
| 2019/0158338 | A1 | 5/2019 | Herath et al. |
| 2019/0181928 | A1 | 6/2019 | Pan et al. |
| 2019/0190753 | A1 | 6/2019 | Bayesteh et al. |
| 2019/0222453 | A1* | 7/2019 | Cao ..................... H04L 27/2627 |
| 2019/0236445 | A1 | 8/2019 | Das et al. |
| 2019/0260441 | A1 | 8/2019 | Akuon et al. |
| 2019/0363821 | A1 | 11/2019 | Whittaker |
| 2019/0386717 | A1 | 12/2019 | Shattil |
| 2019/0392297 | A1 | 12/2019 | Lau et al. |
| 2019/0393948 | A1 | 12/2019 | Zhao et al. |
| 2020/0028727 | A1 | 1/2020 | Chen |
| 2020/0177418 | A1 | 6/2020 | Hoydis et al. |
| 2020/0204421 | A1* | 6/2020 | Levinbook .......... H04L 27/2607 |
| 2022/0060363 | A1 | 2/2022 | Shattil |

FOREIGN PATENT DOCUMENTS

| | | |
|---|---|---|
| CN | 105978655 A | 9/2016 |
| CN | 108737307 A | 2/2018 |
| CN | 105635025 B | 9/2018 |
| EP | 1835682 | 9/2007 |
| EP | 2763321 | 6/2014 |
| EP | 2449690 | 6/2016 |
| EP | 3118573 A1 | 1/2017 |
| JP | 2004-147126 A | 5/2004 |
| JP | 2011-229090 A | 11/2011 |
| JP | 2012109811 | 6/2012 |
| JP | 2013-521741 A | 6/2013 |
| JP | 2017-537514 A | 12/2017 |
| KR | 10-20090033703 | 8/2011 |
| WO | WO2007068214 A1 | 6/2007 |
| WO | WO2011161601 | 12/2011 |
| WO | WO2014199989 A1 | 12/2014 |
| WO | WO2014206461 | 12/2014 |
| WO | WO2016115546 | 7/2016 |
| WO | WO2016172875 A1 | 11/2016 |
| WO | WO2017077848 A1 | 5/2017 |
| WO | WO2017078779 | 5/2017 |
| WO | WO2017186301 | 11/2017 |
| WO | WO2018031709 A1 | 2/2018 |
| WO | WO2018082791 | 5/2018 |
| WO | WO2018083601 | 5/2018 |
| WO | WO2018174686 | 9/2018 |
| WO | WO2019006088 A1 | 1/2019 |
| WO | WO2019023283 | 1/2019 |

OTHER PUBLICATIONS

International Search Report dated Nov. 5, 2018 from corresponding PCT Application No. PCT/US2018/043573.
Extended European Search Report dated Mar. 18, 2021 from corresponding EPO Application No. 18837572.9.
Examination Report, India Patent Office, dated Jul. 26, 2021 from corresponding India Application No. 202047007281.
C-Y. Hsu, et al.; "Novel SLM Scheme with Low-Complexity for PAPR Reduction in OFDM System", IEICE Trans. Fundamentals, vol. E91-A. No. 7, pp. 1689-1696, Jul. 2008.
N. Jacklin, et al.; "A Linear Programming Based Tone Injection Algorithm for PAPR Reduction of OFDM and Linearly Precoded Systems", IEEE Trans. on Circuits and Systems- I: Regular Papers, vol. 60, No. 7, pp. 1937-1945, Jul. 2013.
Examination Report dated Jan. 12, 2022 from corresponding EPO Application No. 18837572.9.
Notice of Reasons for Refusal dated May 19, 2022 from corresponding Japan Appl. No. 2019-556330.
R. Baxley, et al.; "Comparing Selected Mapping and Partial Transmit Sequence for PAR Reduction"; IEEE Transactions on Broadcasting ( vol. 53, Issue: 4, Dec. 2007), pp. 797-803; Dec. 31, 2007.
International Search Report and Written Opinion dated Oct. 4, 2019 from corresponding PCT Application No. PCT/US2019/037399.
I.M. Hussain; "Low Complexity Partial SLM Technique for PAPR Reduction in OFDM Transmitters"; Int. J. on Electrical Engineering and Informatics, vol. 5, No. 1, Mar. 2013.

(56) References Cited

OTHER PUBLICATIONS

A. Boonkajay, et al.; "A blind selected mapping technique for low-PAPR single-carrier signal transmission"; 2015 10th ICICS, Apr. 28, 2016.

China National Intellectual Property Administration, first Office Action for Appl. No. 201980040903.3; Nov. 10, 2023.

China National Intellectual Property Administration, second Office Action for Appl. No. 201980040903.3; Apr. 30, 2024.

Extended European Search Report dated Jan. 26, 2022 from corresponding EPO Application No. 19822936.1 (Corresponding to PCT/US2019/037399).

Intellectual Property India; Examination Report dated Dec. 27, 2021 from corresponding Appl. No. 20204704503.

T.Nylanden, et al. "A GPU Implementation for two MIMO-OFDM Detectors"; 2010 International Conference on Embedded Computer Systems: Architectures, Modeling and Simulation; Jul. 19-22, 2010.

L. Xu, et al.; "Resource allocation based on quantum particle swarm optimization and RBF neural network for overlay cognitive OFDM System"; Neurocomputing; vol. 173, Part 3, pp. 1250-1256; Jan. 15, 2016.

W. Xu, et al.; "Joint Sensing Duration Adaptation, User Matching, and Power Allocation for Cognitive OFDM-NOMA Systems"; IEEE Transactions on Wireless Communications, pp. 1269-1282 ( vol. 17, Issue: 2, Feb. 2018).

International Search Report dated Nov. 25, 2020 from corresponding PCT Application No. PCT/US2020/045773.

International Search Report and Written Opinion of the International Searching Authority dated May 20, 2020 from corresponding PCT Application No. PCT/US2020/014862.

International Preliminary Report on Patentability dated Jul. 27, 2021 from corresponding PCT Application No. PCT/US2020/014862.

Intellectual Property India Examination Report dated May 13, 2022 from National Stage Application No. 202147033497.

International Search Report and Written Opinion of the International Searching Authority dated Aug. 31, 2020 from corresponding PCT Application No. PCT/US2020/034071.

Examination Report from Intellectual Property India for corresponding application No. 202147051388, mailed Mar. 30, 2022.

Yuanwei Liu et al., 'Non-Orthogonal Multiple Access for 5G and Beyond', arXiv:1808.00277, Aug. 1, 2018 [retrieved on Aug. 21, 2020]. Retrieved from <URL: https://arxiv.org/abs/1808.00277>. pp. 1-54.

3rd Generation Partnership Project; Technical Specification Group SA; Feasibility Study for Proximity Services (ProSe) (Release 12); 3GPP TR 22.803 V2.0.0 (Nov. 2012).

J.S. Chow, et al.; "Equalizer Training Algorithms for Multicarrier Modulation Systems," Communications, 1993. ICC '93 Geneva. Technical Program, Conference Record, IEEE International Conference on; vol. 2, May 23-26, 1993, pp. 761-765.

Vrcelj et al. "Pre-and post-processing for optimal noise reduction in cyclic prefix based channel equalizers." Communications, 2002. ICC 2002. IEEE International Conference on. vol. 1. IEEE, 2002.

LTE: Evolved Universal Terrestrial Radio Access (E-UTRA); Physical channels and modulation (3GPP TS 36.211 version 8.7.0 Release 8), Jun. 2009.

LTE: Evolved Universal Terrestrial Radio Access (E-UTRA); Multiplexing and channel coding (3GPP TS 36.212 version 8.8.0 Release 8), Jan. 2010.

3GPP TR 21.914 version 0.8.0 Release 14: Technical Specification Group Services and Systems Aspects. (Jun. 2018).

3GPP TR 21.915 version 0.5.0 Release 15: Technical Specification Group Services and Systems Aspects.

* cited by examiner

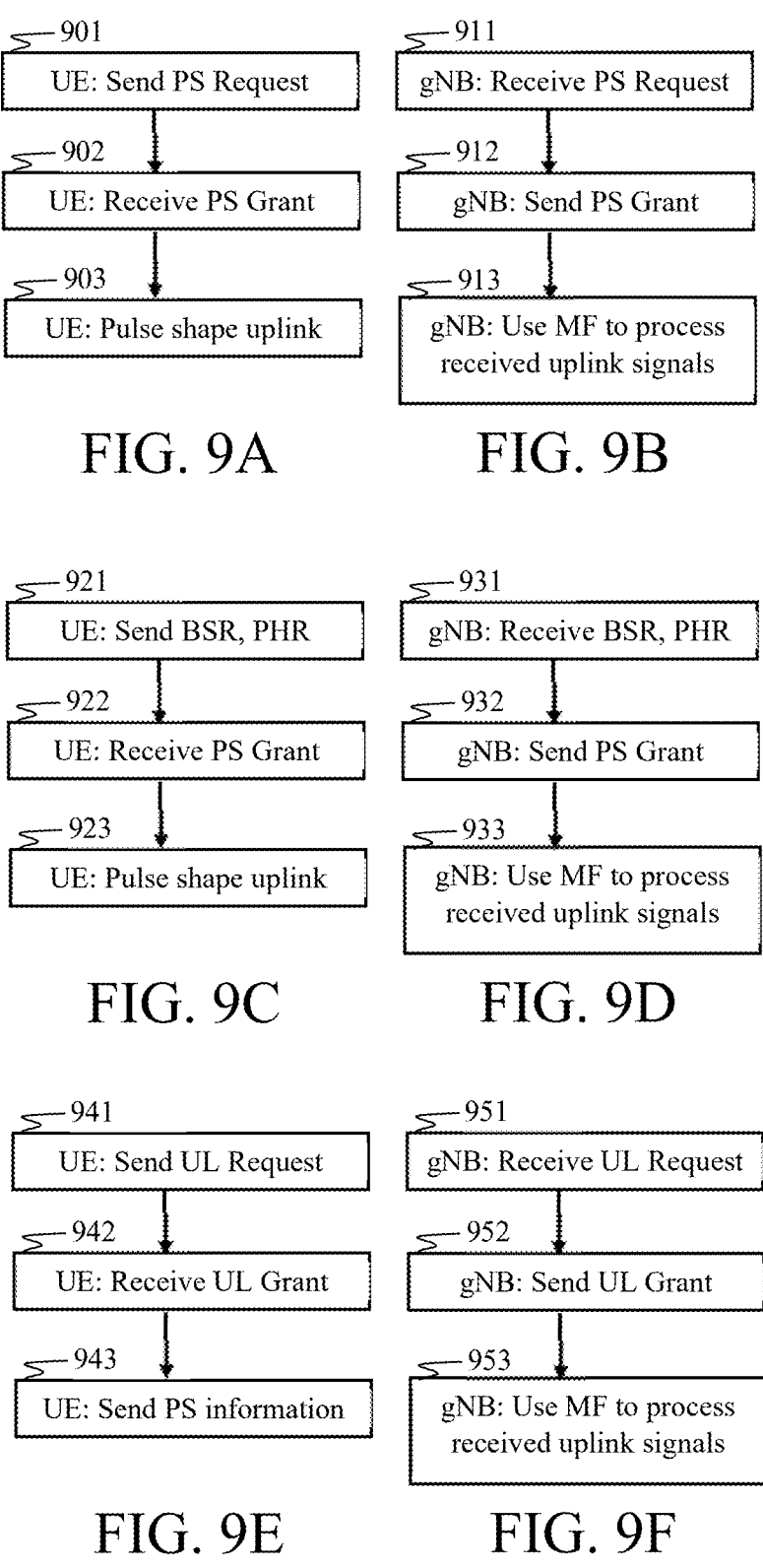

901
UE: Send PS Request

902
UE: Receive PS Grant

903
UE: Pulse shape uplink

FIG. 9A 911
gNB: Receive PS Request 912
gNB: Send PS Grant 913
gNB: Use MF to process received uplink signals

FIG. 9B

921
UE: Send BSR, PHR

922
UE: Receive PS Grant

923
UE: Pulse shape uplink

FIG. 9C 931
gNB: Receive BSR, PHR 932
gNB: Send PS Grant 933
gNB: Use MF to process received uplink signals

FIG. 9D

941
UE: Send UL Request

942
UE: Receive UL Grant

943
UE: Send PS information

FIG. 9E 951
gNB: Receive UL Request 952
gNB: Send UL Grant 953
gNB: Use MF to process received uplink signals

FIG. 9F

ORTHOGONAL MULTIPLE ACCESS AND NON-ORTHOGONAL MULTIPLE ACCESS

This application is a Continuation of U.S. patent application Ser. No. 17/751,654, filed on May 23, 2022, now U.S. Pat. No. 11,917,604, which is a Continuation of U.S. patent application Ser. No. 16/994,622, filed on Aug. 16, 2020, now U.S. Pat. No. 11,343,823, which is a Continuation of U.S. patent application Ser. No. 16/751,946, filed on Jan. 24, 2020, now U.S. Pat. No. 10,880,145, which claims the priority benefit of U.S. Patent Application Ser. No. 62/796,994, filed on Jan. 25, 2019.

BACKGROUND

Aspects of the disclosure relate generally to wireless communication networks, and more particularly, to precoding multicarrier waveforms for orthogonal multiple access (OMA) or non-orthogonal multiple access (NOMA).

The background description includes information that may be useful in understanding the present inventive subject matter. It is not an admission that any of the information provided herein is prior art or relevant to the presently claimed inventive subject matter, or that any publication, specifically or implicitly referenced, is prior art.

Wireless communication systems provide various telecommunication services, such as telephony, video, data, messaging, and broadcasts. Wireless communication systems may employ multiple-access technologies capable of supporting communication with multiple users by sharing available system resources (e.g., time, frequency, power). Typically, a wireless system reserves a sufficient amount of spectral resources to meet the system's peak demand, which seldom occurs. Thus, spectral resources are often underutilized. Examples of multiple-access technologies include code division multiple access (CDMA), time division multiple access (TDMA), frequency division multiple access (FDMA), orthogonal frequency division multiple access (OFDMA), single-carrier frequency divisional multiple access (SC-FDMA), and discrete Fourier transform spread orthogonal division multiplexing (DFT-s-OFDM). It should be understood that SC-FDM and DFT-s-OFDM are two names of essentially similar technologies, known as Carrier Interferometry (CI). However, DFT-s-OFDM is the terminology used in 3GPP specifications.

These multiple access technologies have been adopted in various telecommunication and wireless network standards. For example, fifth generation (5G) (also called New Radio (NR)) wireless access is being developed with three broad use case families in mind: enhanced mobile broadband (eMBB), massive or enhanced machine-type communications (MTC), and ultra-reliable low-latency communications (URLLC). Beyond 5G refers to visions for future generations of wireless communications (e.g., 5G-Advanced, 5G-Extreme, 6G) that enable groundbreaking high-bandwidth, low-latency, massive capacity, and massive connectivity. As demand for telecommunication and wireless access continues to increase, improvements in NR communications technology and beyond may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects.

To realize 5G and Beyond 5G, various technologies are proposed, including Massive multiple-input multiple output (MIMO), Cooperative MIMO, millimeter wave (mmWave) communications, NOMA, device-to-device (D2D), proximity services (ProSe), mobile relays, airborne relays, software-defined networking, fog computing, and distributed Artificial Intelligence (AI). Many infrastructure functions can be pushed to the network's edge to reduce latency, extend coverage, enhance versatility, and exploit the computational resources of the vast number of user devices. Mobile edge computing (MEC) can promptly process computationally intensive jobs offloaded from mobile devices, thus reducing end-to-end latency. Edge computing modules can be in a base transceiver stations (BTSs), relay, or user equipment (UE).

Aspects disclosed herein are broadly applicable to wireless standards and use case families disclosed herein, including (but not limited to) cellular, mobile broadband, vehicular ad-hoc networks, fixed broadband, Internet of Things (IoT), peer-to-peer networks, mesh networks, wireless personal area networks (WPANs), wireless local area networks (WLANs), wireless sensor networks, airborne networks, satellite networks, network fabrics, software-defined networks (SDNs), and hybrid networks.

In one aspect, a method of communication by a wireless device configured for communicating in a wireless network comprises spreading a data signal with at least one spreading code to produce a spread data signal; and modulating the spread data signal onto an OFDM signal to generate a discrete-time spread-OFDM signal to be transmitted in a communication link. The spreading can employ a function of a power-efficiency criterion for the wireless device or a spectral efficiency criterion for the communication link, for selecting one of a plurality of spreading code roll-off factors that provides the discrete-time spread-OFDM signal with a low Peak-to-Average-Power Ratio (PAPR).

An apparatus may include a means for spreading, a means for modulating, and a means for selecting one of a plurality of roll-off factors (e.g., pulse shapes) in the code space of the spread-OFDM signal based on the power-efficiency criterion for the wireless device or the spectral efficiency criterion for the communication link, such as described in the above method.

In another aspect, a method for wireless communication comprises encoding data bits of a first layer to a set of coded symbols; generating spread symbols using discrete Fourier transform spread orthogonal frequency division multiplexing (DFT-s-OFDM) spreading codes; and modulating the spread symbols onto a set of OFDM subcarrier frequencies to produce a discrete-time OFDM signal. The generating comprises mapping the coded symbols to a first sparse DFT-s-OFDM code space in a DFT-s-OFDM symbol, wherein the first sparse DFT-s-OFDM code space is different from a second sparse DFT-s-OFDM code space in the DFT-s-OFDM symbol, the second sparse DFT-s-OFDM code space being employed by a second layer. A sparse DFT-s-OFDM code space is a DFT-s-OFDM code space that has fewer than the total number of DFT-s-OFDM codes in a DFT-s-OFDM symbol.

An apparatus may include a means for encoding, a means for generating, and a means for modulating, wherein the means for generating includes a means for mapping the coded symbols to the first sparse DFT-s-OFDM code space in a DFT-s-OFDM symbol, such as described in the above method.

In another aspect, a method of communications comprises synthesizing a kernel waveform, wherein the kernel waveform has a sparse DFT-s-OFDM code space (i.e., a code space that has fewer than the total number of DFT-s-OFDM codes in a DFT-s-OFDM symbol); and performing a cyclic shift of the kernel waveform to produce a cyclic-shifted waveform having a DFT-s-OFDM code space that is different than the DFT-s-OFDM code space of the kernel waveform. The cyclic-shifted waveform may be transmitted in a communication channel; or may be modulated with data and transmitted; or may be combined with at least one other signal and transmitted. The kernel waveform may have a selectable pulse shape. An apparatus may include a means for synthesizing and a means for performing the cyclic shift, such as described in the above method. An apparatus may include a processor, memory in electronic communication with the processor, and instructions stored in the memory, wherein the instructions are operable to cause the processor to perform the above methods. A non-transitory computer-readable medium may include instructions operable to cause a processor to perform the above methods.

Some examples of the method, apparatus, and non-transitory computer-readable medium described above may further include determining occupancy or availability of resource blocks in the communication link, and the spectral efficiency criterion may be determined by listening to at least one of a random access channel, an uplink control channel, an uplink shared channel, a downlink control channel, or a downlink shared channel. The aforementioned channels may include a physical random access channel (PRACH), a physical downlink control channel (PDCCH), a physical downlinks channel (PDSCH), a physical uplink shared channel (PUSCH), a physical uplink control channel (PUCCH), a physical hybrid automatic repeat request (HARQ) indicator channel (PHICH), or a physical control format indicator channel (PCFICH). Any of the aforementioned channels may be employed to communicate pulse-shaping and/or code-space information. Those of ordinary skill in the art will recognize that other channels or carriers may be utilized in addition to those described, such as other traffic, control, and feedback channels. Some aspects provide for request and grant mechanisms for selecting and/or scheduling frequency-domain pulse shaping to be used, such as by a UE, BTS, or relay. Uplink and/or downlink grants may comprise DFT-s-OFDM code space grants, such as to enable multiple layers to share the same physical resource blocks (PRBs), also referred to as resource blocks.

Some examples of the method, apparatus, and non-transitory computer-readable medium described above may employ a downlink, an uplink, a relay link, or a peer-to-peer link; or wherein access to resources is grant-based or grant-free; or wherein the discrete-time spread-OFDM signal is transmitted by a BTS, a UE, a relay, or a cooperative group of wireless devices; or wherein the OFDM signal is configured for at least one of orthogonal multiple access and non-orthogonal multiple access. Code spaces within an OFDM symbol interval can be provisioned for any combination of uplink and downlink communications. Some aspects can switch between uplink and downlink based on the needs of the network, the needs of the devices, and the required communications flow in each direction.

Some examples of the method, apparatus, and non-transitory computer-readable medium described above may employ a spreading code roll-off factor that is one of a plurality of selectable spreading code roll-off factors, each of the plurality of spreading code roll-off factors providing for a different capacity when the OFDM signal comprises a fixed set of resource blocks; or wherein the spreading code roll-off factor is one a plurality of selectable spreading code roll-off factors that provide for a constant capacity when the OFDM signal comprises a variable set of resource blocks.

Some examples of the method, apparatus, and non-transitory computer-readable medium described above may be used in at least one of eMBB, MTC, URLLC, mmWave, D2D, ProSe, MEC, vehicular network communications, or IoT communications. D2D and ProSe includes use cases wherein a UE supports ProSe Discovery and/or ProSe Communication (e.g., a ProSe-enabled UE). 3GPP Services working group defined use cases and scenarios for ProSe in TR 22.803, which is incorporated by reference in its entirety. In this document, conditions for service flows and potential requirements for different use cases are analyzed to support D2D systems design.

In some examples of the method, apparatus, and non-transitory computer-readable medium described above, each layer can be assigned to its own sparse DFT-s-OFDM code space, and each layer may have its coded symbols transmitted thereon; or each layer can be assigned a unique identity symbol value, and each selected sparse DFT-s-OFDM code space may be selected for transmission based on one or more of the set of NOMA symbols, and each layer has its unique identity symbol value transmitted in the selected sparse DFT-s-OFDM code space.

In some examples of the method, apparatus, and non-transitory computer-readable medium described above, data symbols to be transmitted are NOMA symbols, and a first sparse DFT-s-OFDM code space is provisioned to overlap a second sparse DFT-s-OFDM code space; or the data symbols are Quadrature Amplitude Modulated symbols; or the first sparse DFT-s-OFDM code space is inside an OMA code-space subset of the DFT-s-OFDM symbol's full code space; or wherein the first sparse DFT-s-OFDM code space comprises a first DFT-s-OFDM code in a first DFT-s-OFDM symbol and at least a second DFT-s-OFDM code in a second DFT-s-OFDM symbol. The order of a sequence or block of symbols into a DFT spreader can provide for mapping particular symbols to particular DFT-s-OFDM codes. Thus, mapping each symbol to a particular code can be effected by selecting the order (i.e., where in the sequence or block each symbol is located). In some examples of the method, apparatus, and non-transitory computer-readable medium described above, sparse DFT-s-OFDM codes instead of the relatively short sparse code multiple access (SCMA) codes are configured to provide for higher spreading (processing) gain, improved frequency diversity, and/or SCMA-OFDM with improved power efficiency via PAPR-reduction.

Some examples of the method, apparatus, and non-transitory computer-readable medium described above are anticipated to operate with D2D communication, which enables direct communication between two physically close terminals. D2D can be used for some ultra-low latency applications, as it provides a direct link between wireless devices without going through the network infrastructure. D2D might use inband or outband communication, where inband may use underlay inband D2D mode or overlay inband D2D mode. Aspects disclosed herein can be configured for Proximity Services (ProSe) operations, such as to provide for D2D, cooperative processing, smart industrial sensor networks, mobile sensor networks, mobile ad-hoc networks, vehicular ad-hoc networks, navigation sensor networks, mobile relay networks, cooperative content sharing, and content delivery in mobile radio networks.

In some examples of method, apparatus, and non-transitory computer-readable medium aspects, a receiver may employ a pulse-shaping filter configured to process pulse-shaped signals and/or a DFT-s-OFDM code space demultiplexer configured to demultiplex one or more layers that are sparsely distributed in a DFT-s-OFDM code space. Components in the examples of the method, apparatus, and non-transitory computer-readable medium described with respect to transmitter operations may have corresponding complementary components in receiver method, apparatus, and non-transitory computer-readable medium examples disclosed herein.

In some examples of method, apparatus, and non-transitory computer-readable medium aspects, individual transmissions from separate devices can produce a multiplexed data stream when received by a receiver. NOMA DFT-s-OFDM codewords include sparse DFT-s-OFDM codewords that overlap in the code space, and therefore can be identified upon reception of the multiplexed data stream using a low complexity algorithm, such as a message-passing algorithm (MPA), turbo decoder (TD), successive interference cancellation (SIC), maximum likelihood estimation (MLE), or an artificial neural network (ANN). In one aspect, the sparsity pattern of each sparse DFT-s-OFDM codeword uniquely identifies its layer, and the receiver estimates the data transmitted in each layer. In another aspect, each data symbol value is mapped (e.g., transformed) to a unique sparse DFT-s-OFDM codeword, and each layer is uniquely identified by an identity symbol value. The identity symbol value can be configured to be unique and separable from others when received at the receiver, which can be achieved by a BTS that carefully assigns identity symbol values to the layers based on channel state information (CSI) or received signal strength (RSS). The receiver can determine which layer(s) transmitted each data symbol, such as by using MPA, TD, SIC, MLE, or an ANN.

Groupings of alternative elements or aspect of the disclosed subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified, thus fulfilling the written description of all Markush groups used in the appended claims.

All methods described herein can be performed in any suitable order unless otherwise indicated herein or otherwise clearly contradicted by context. The use of any and all examples, or exemplary language (e.g., "such as") provided with respect to certain aspect herein is intended merely to better illuminate the inventive subject matter and does not pose a limitation on the scope of the inventive subject matter otherwise claimed. No language in the specification should be construed as indicating any non-claimed element as essential to the practice of the inventive subject matter.

All patent applications and patents mentioned in this disclosure are hereby incorporated by reference in their entireties: U.S. Pat. Nos. 8,670,390, 9,225,471, 9,270,421, 9,325,805, 9,473,226, 8,929,550, 7,430,257, 6,331,837, 7,076,168, 7,965,761, 8,098,751, 7,787,514, 9,673,920, 9,628,231, 9,485,063, patent application Ser. No. 10/145, 854, patent application Ser. No. 14/789,949, Pat. Appl. No. 62/197,336, patent application Ser. No. 14/967,633, Pat.

Appl. No. 60/286,850, patent application Ser. No. 14/709, 936, patent application Ser. No. 14/733,013, patent application Ser. No. 14/789,949, patent application Ser. No. 13/116, 984, patent application Ser. No. 15/218,609, patent application Ser. No. 15/347,415, patent application Ser. No. 15/988,898, patent application Ser. No. 16/021,001, patent application Ser. No. 16/307,039, Pat. Appl. No. 62/510,987, Pat. Appl. No. 62/527,603, Pat. Appl. No. 62/686,083, Pat. Appl. No. 62/778,894, Pat. Appl. No. 62/662,140, Pat. Appl. No. 62/536,955, and PCT/US16/43852.

All publications disclosed herein are incorporated by reference in their entireties, including: J. S. Chow, J. M. Cioffi, J. A. C. Bingham; "Equalizer Training Algorithms for Multicarrier Modulation Systems," Communications, 1993. ICC '93 Geneva. Technical Program, Conference Record, IEEE International Conference on; Vol: 2, 23-26 May 1993, pp. 761-765; Vrcelj et al. "Pre- and post-processing for optimal noise reduction in cyclic prefix based channel equalizers." Communications, 2002. ICC 2002. IEEE International Conference on. Vol. 1. IEEE, 2002; LTE: Evolved Universal Terrestrial Radio Access (E-UTRA); Physical channels and modulation (3GPP TS 36.211 version 8.7.0 Release 8), June. 2009; LTE: Evolved Universal Terrestrial Radio Access (E-UTRA); Multiplexing and channel coding (3GPP TS 36.212 version 8.8.0 Release 8), January 2010; 3GPP TR 21.914 version 0.8.0 Release 14: Technical Specification Group Services and Systems Aspects; and 3GPP TR 21.915 version 0.5.0 Release 15: Technical Specification Group Services and Systems Aspects.

BRIEF DESCRIPTION OF DRAWINGS

Flow charts depicting disclosed methods comprise "processing blocks" or "steps" that may represent computer software instructions or groups of instructions. Alternatively, the processing blocks or steps may represent steps performed by functionally equivalent circuits, such as a digital signal processor (DSP), a field programmable gate array (FPGA), an application specific integrated circuit (ASIC), or a graphics processing unit (GPU) or a computer processing unit (CPU) programmed with software instructions to perform disclosed methods. It will be appreciated by those of ordinary skill in the art that unless otherwise indicated herein, a particular sequence of steps described is illustrative only and can be varied. Unless otherwise stated, the steps described herein are unordered, meaning that the steps can be performed in any convenient or desirable order.

US 12,580,800 B2

7

Figure 4A:
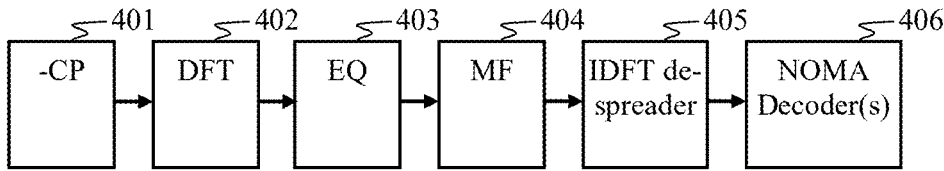

FIG. 4A is a block diagram that depicts a receiver according to some aspects of the disclosure.

Figure 4B:
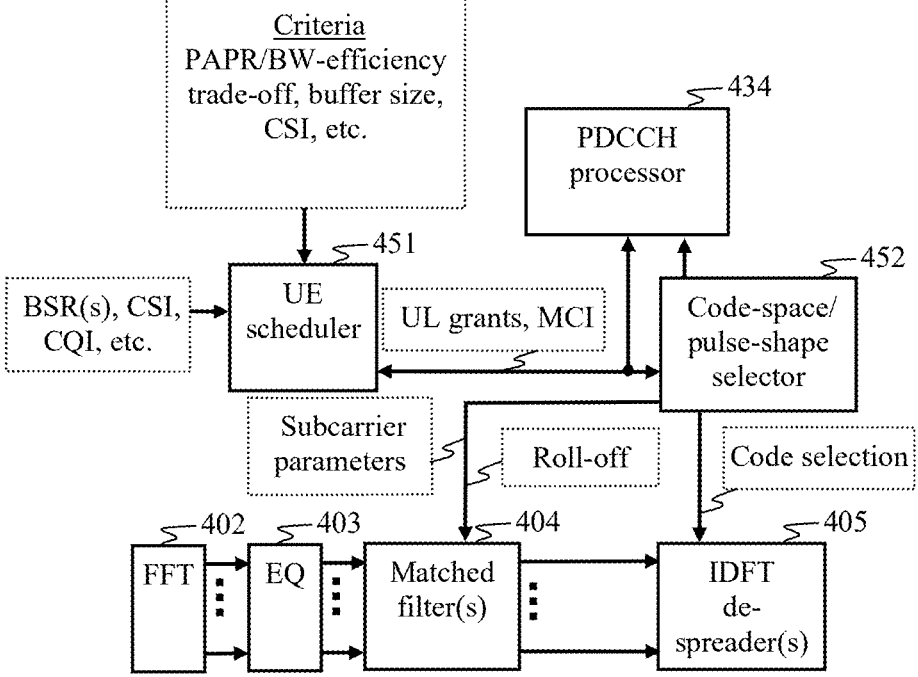

FIG. 4B is a block diagram of a receiver in accordance with aspects of the disclosure.

Figure 5A:
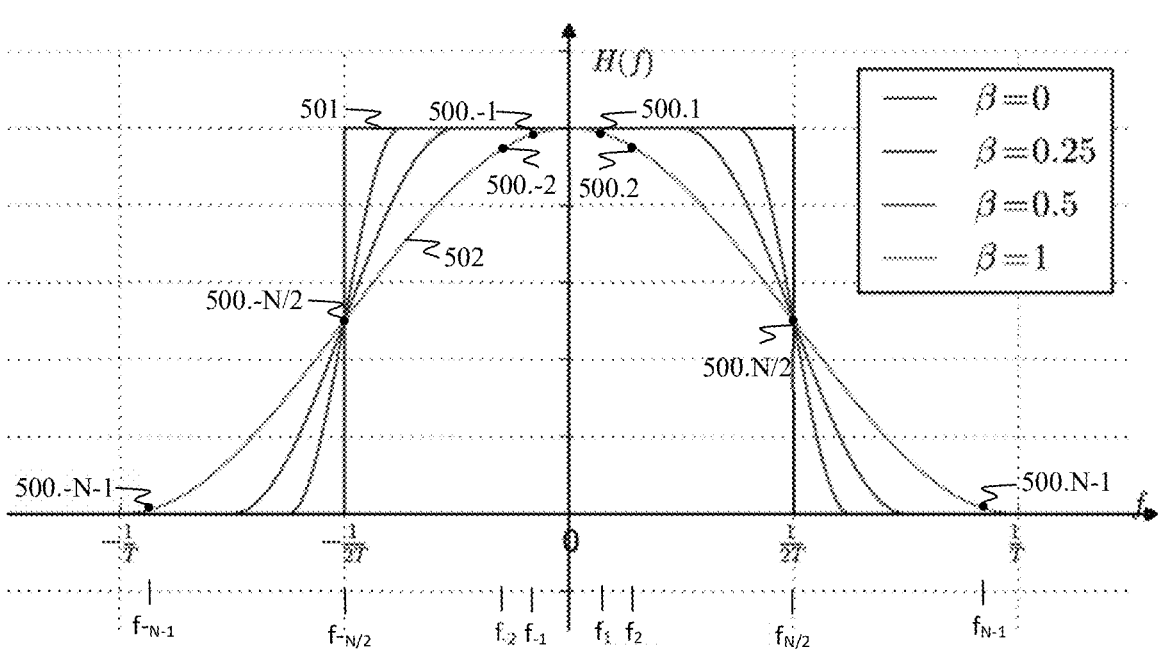
Figure 5B:
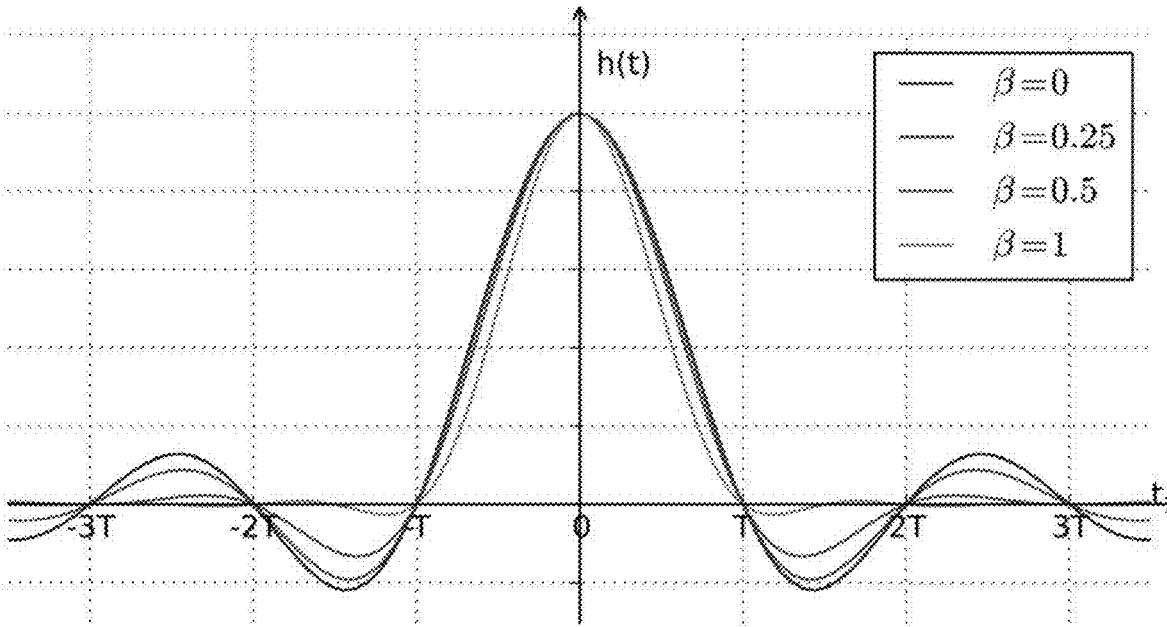

FIG. 5A illustrates a set of selectable frequency-domain pulse shape functions, and FIG. 5B illustrates corresponding time-domain pulse shapes.

Figure 6A:
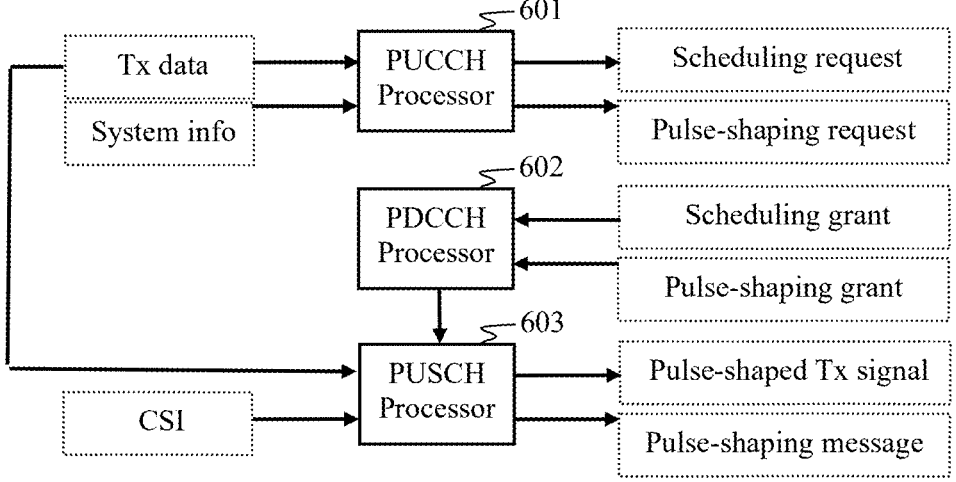

FIG. 6A is a block diagram of a processor configuration and set of processing operations that may be employed by a UE in accordance with some aspects of the disclosure.

Figure 6B:
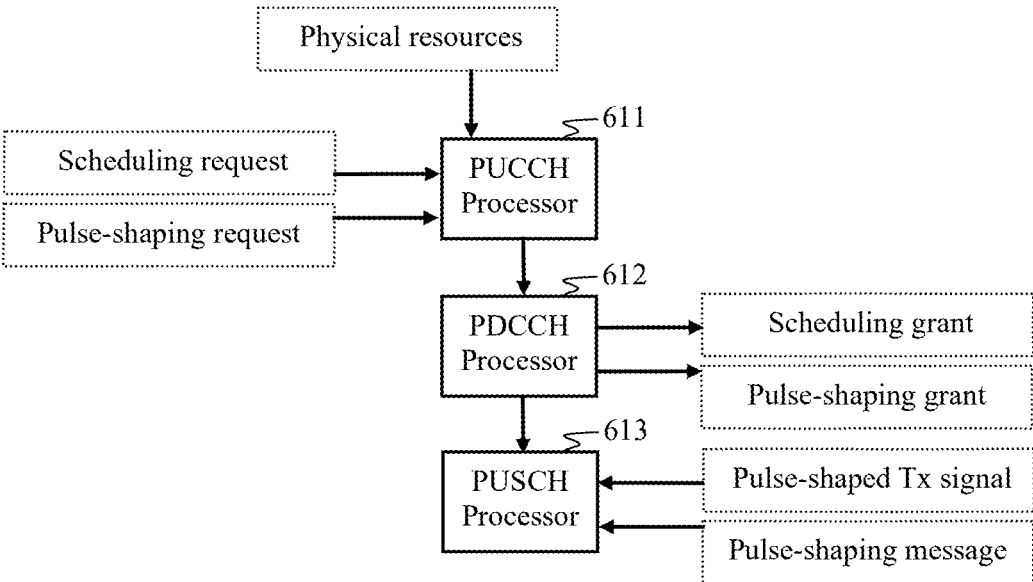

FIG. 6B is a block diagram of a processor and set of processing operations that may be employed by a BTS in accordance with some aspects of the disclosure.

FIGS. 7A-7D are message sequence charts that depict communications between a network node (e.g., a BTS or some other network node) and a UE. The messaging may employ grant-based or grant-free access schemes.

Figure 8:
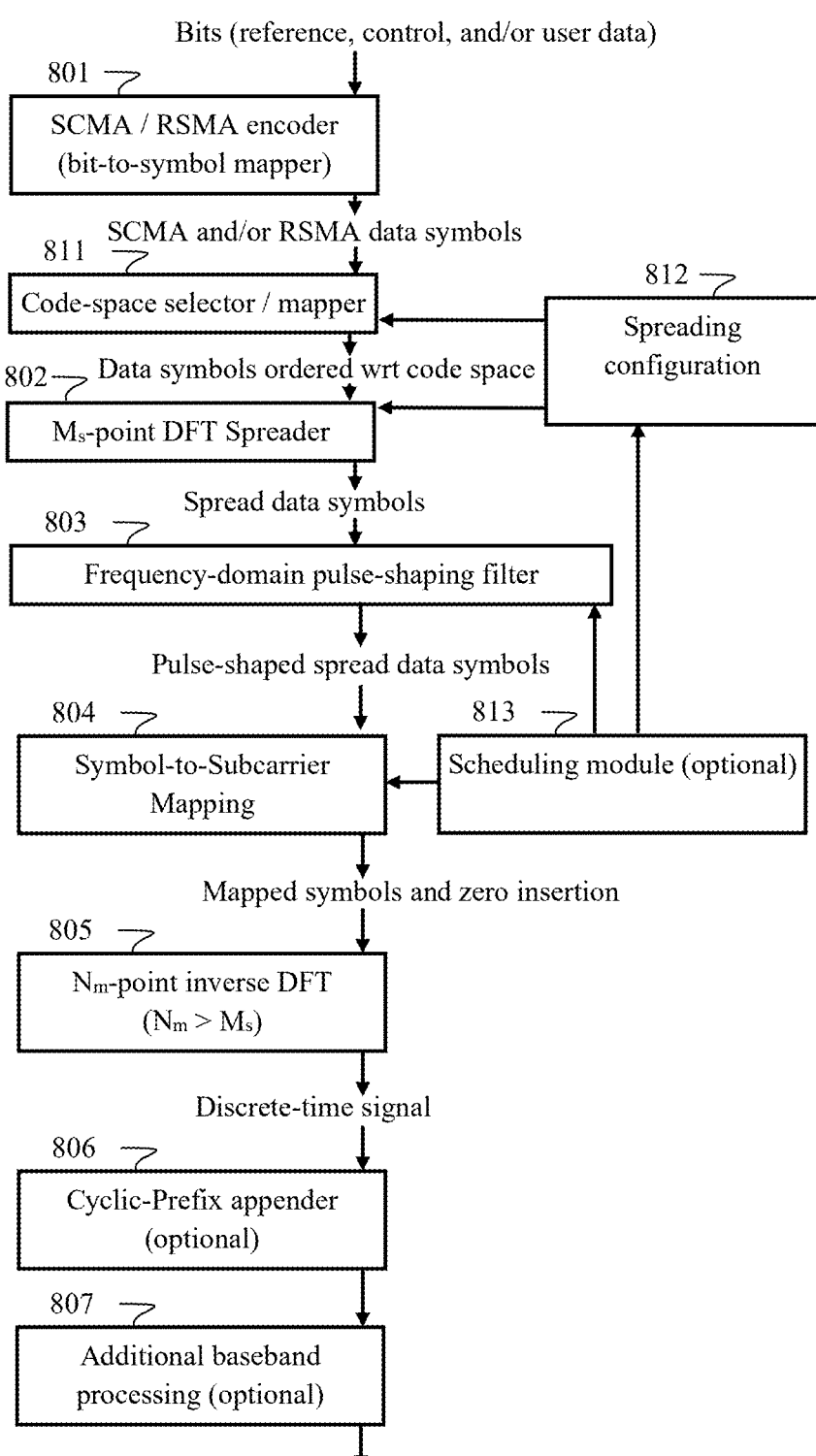

FIG. 8 is a block diagram that depicts a non-transient computer-readable memory comprising a set of instructions stored therein and executable by a processor to perform methods in accordance with aspects of the disclosure.

FIG. 9A is a flow diagram that depicts pulse-shape provisioning performed by a UE. A UE can send a pulse shape request message on an uplink channel, possibly along with an uplink grant request, to a BTS.

FIG. 9B is a flow diagram that depicts pulse-shape provisioning performed by a gNB. A BTS receives a pulse-shape request in an uplink channel from a UE.

FIG. 9C is a flow diagram that depicts pulse-shape provisioning performed by a UE. A UE sends a UE status message on an uplink channel, possibly along with an uplink grant request, to a gNB.

FIG. 9D is a flow diagram that depicts pulse-shape provisioning performed by a gNB. A gNB can receive a UE status message in an uplink channel from a UE.

FIG. 9E is a flow diagram that depicts pulse-shape provisioning performed by a UE. A UE can send an uplink request message on an uplink channel to a BTS.

FIG. 9F is a flow diagram that depicts pulse-shape provisioning from the perspective of a gNB. A BTS can receive an uplink request in an uplink channel from a UE.

Figure 10A:
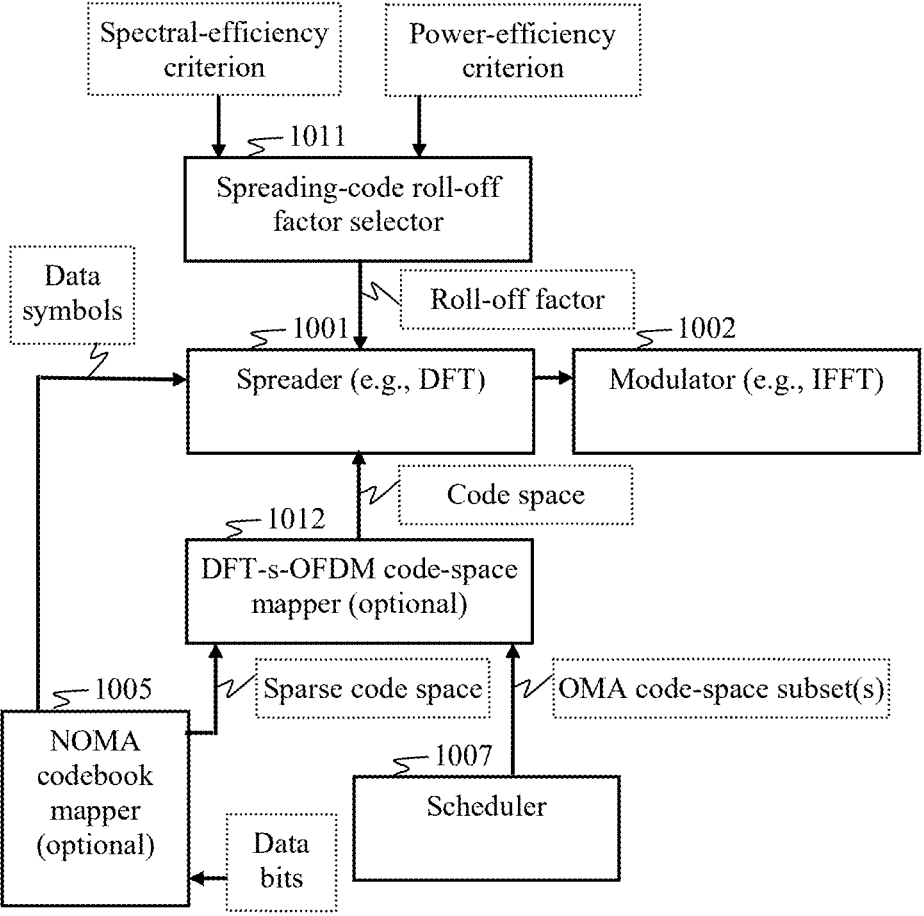
Figure 10B:
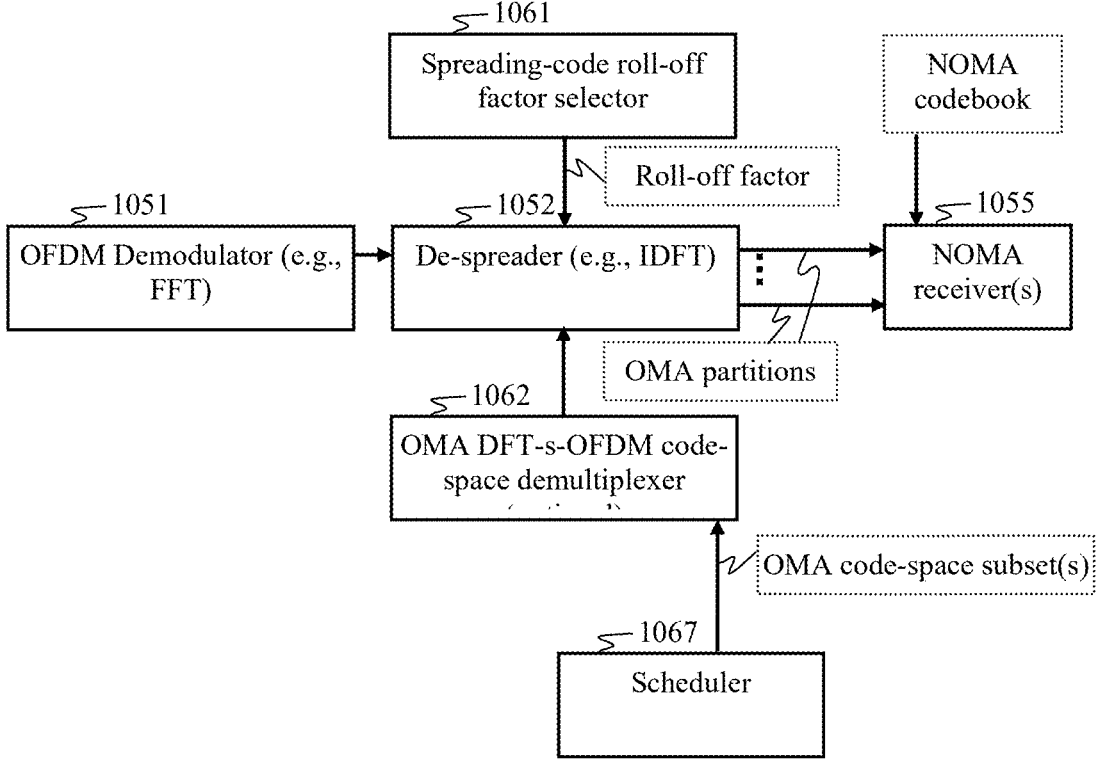

FIG. 10A is a block diagram that depicts apparatus, method, and computer instructions that can synthesize transmission signals according to some aspects of the disclosure, and FIG. 10B is a block diagram that depicts apparatus, method, and computer instructions that can process received signals according to some aspects of the disclosure.

Figure 11:
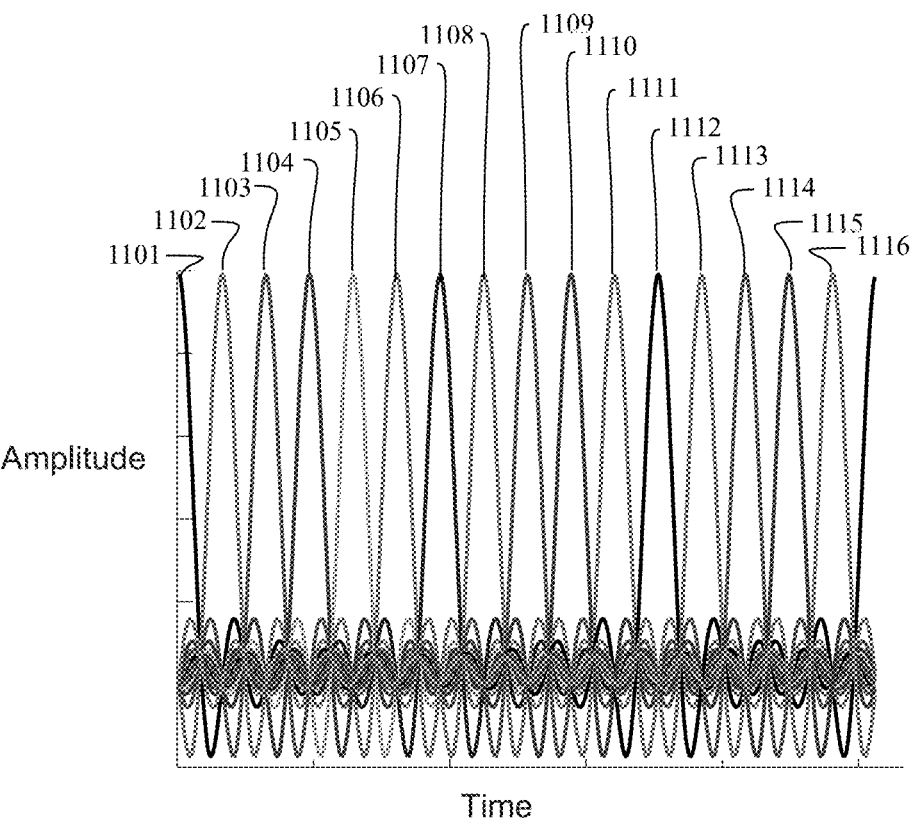

FIG. 11 illustrates code spaces in a discrete-time signal for M=16 and a Rect function pulse shape in the frequency domain. The code spaces are represented by the real part of a complex discrete-time signal output by an IDFT.

Figure 12:
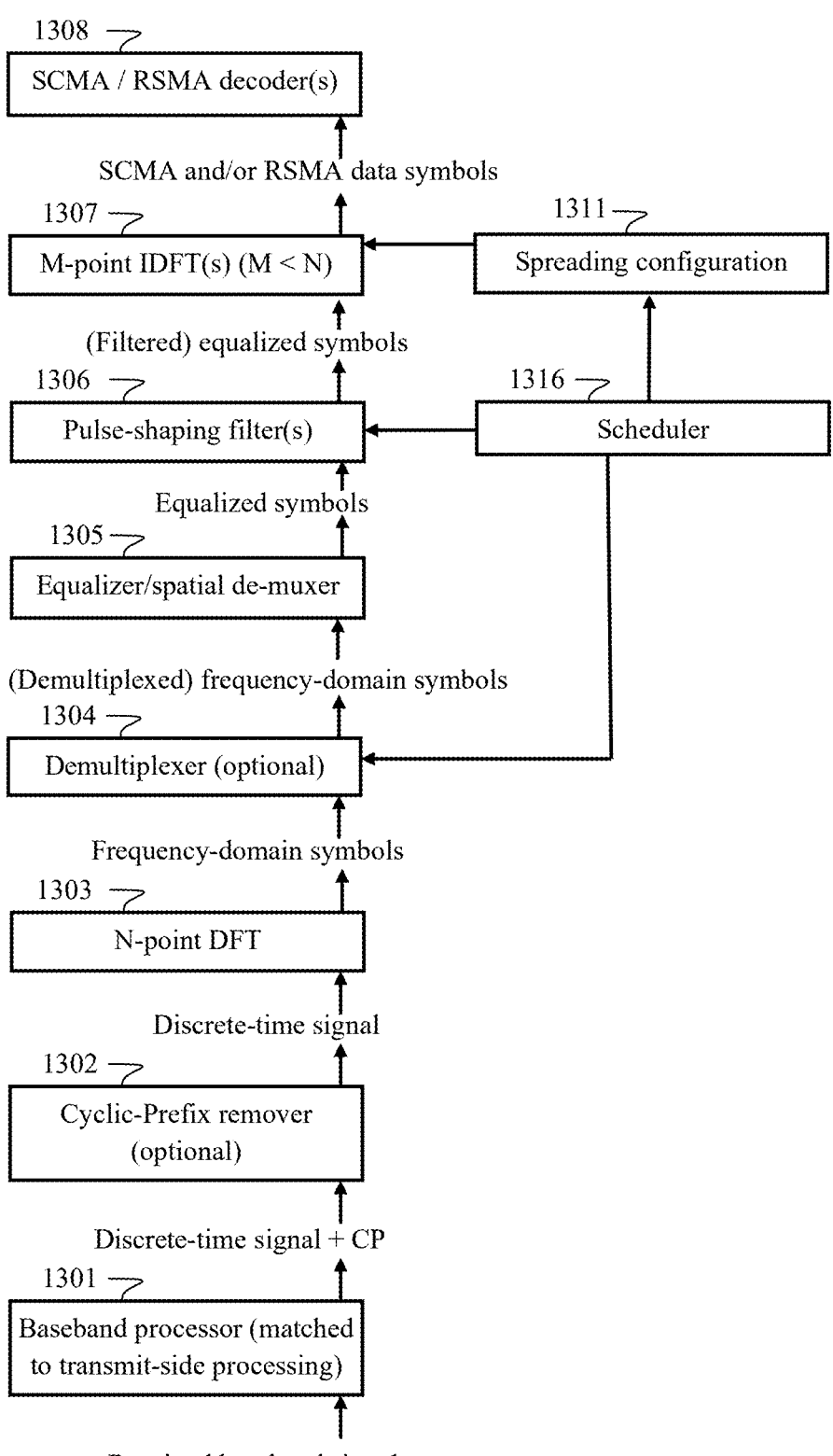

FIG. 12 is a block diagram that depicts functional aspects of apparatus and method configurations of the disclosure, and may include a non-transient computer-readable memory comprising a set of instructions stored therein and executable by a processor.

Figure 13:
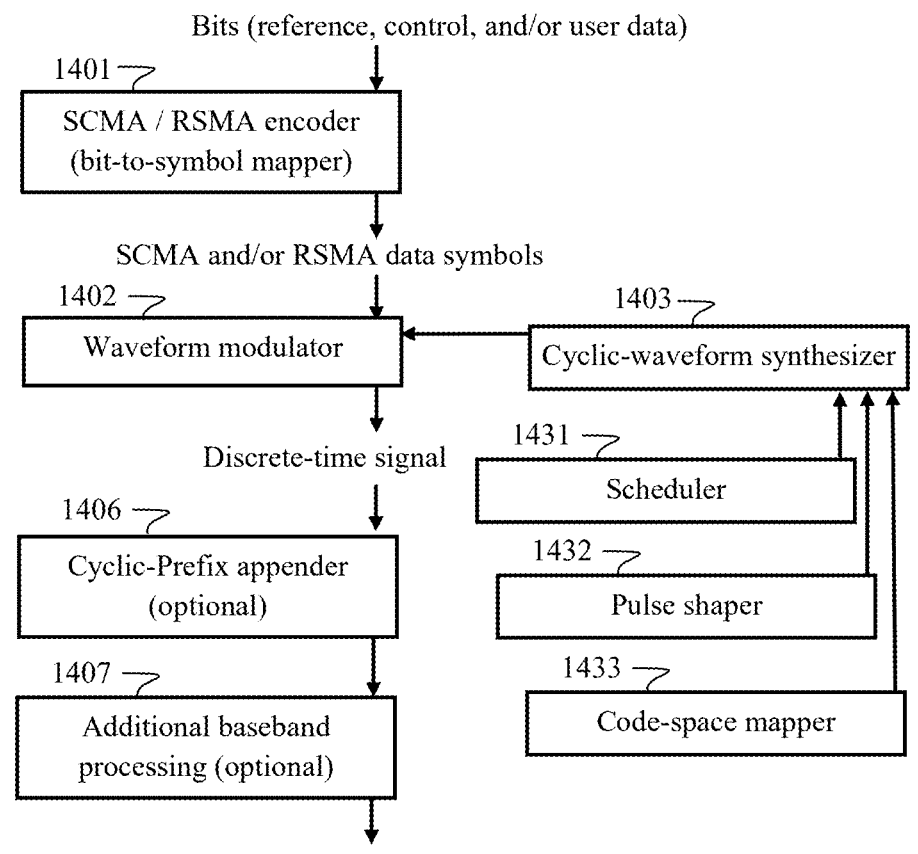

FIG. 13 is a block diagram that illustrates apparatus and method aspects configured according to the disclosure.

Figure 14:
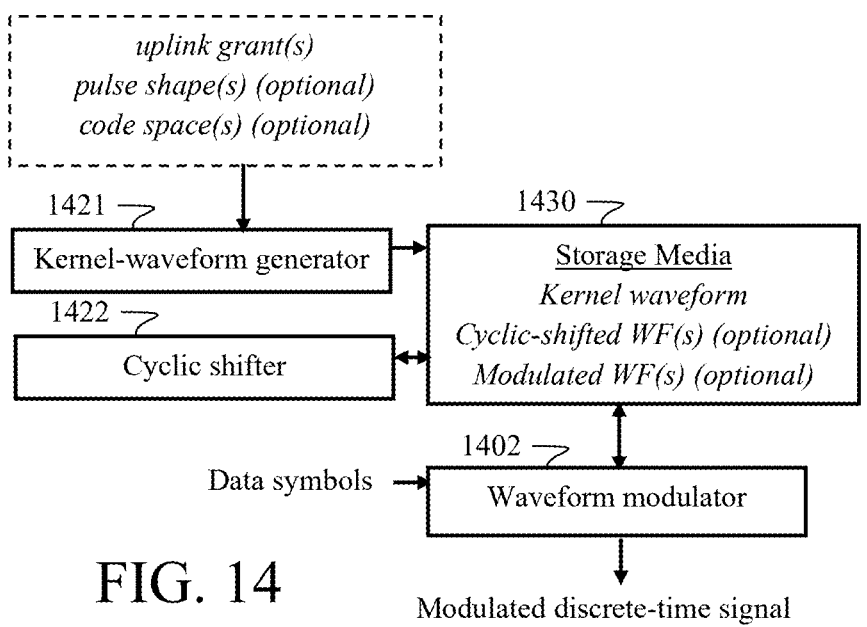

FIG. 14 is a block diagram of a cyclic-waveform generator according to some aspects of the disclosure.

Figure 15A:
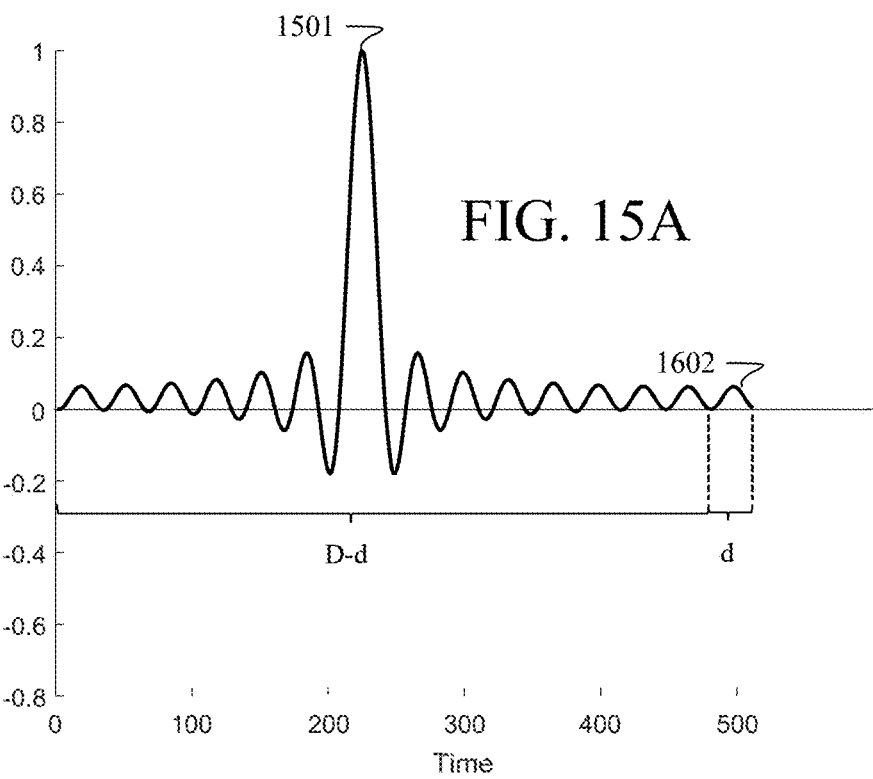
Figure 15B:
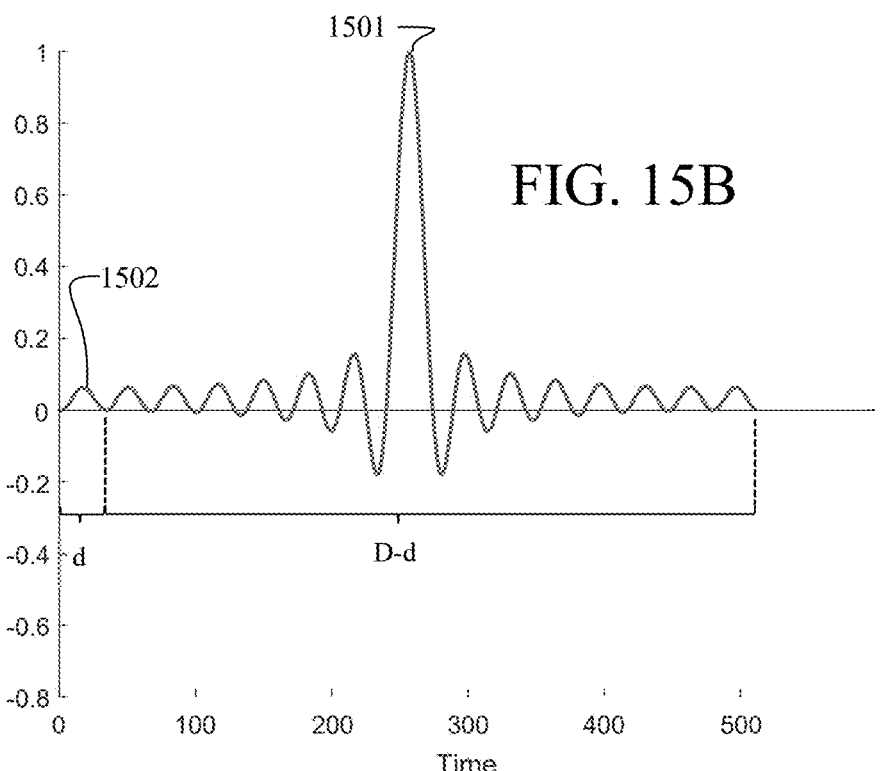

FIG. 15A illustrates the real part of a discrete-time waveform of a DFT-s-OFDM signal corresponding to an $n^{th}$ spreading code, $s_n$; and FIG. 15B illustrates a cyclic shifted version of the discrete-time waveform illustrated in FIG. 15A.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways.

Figure 1:
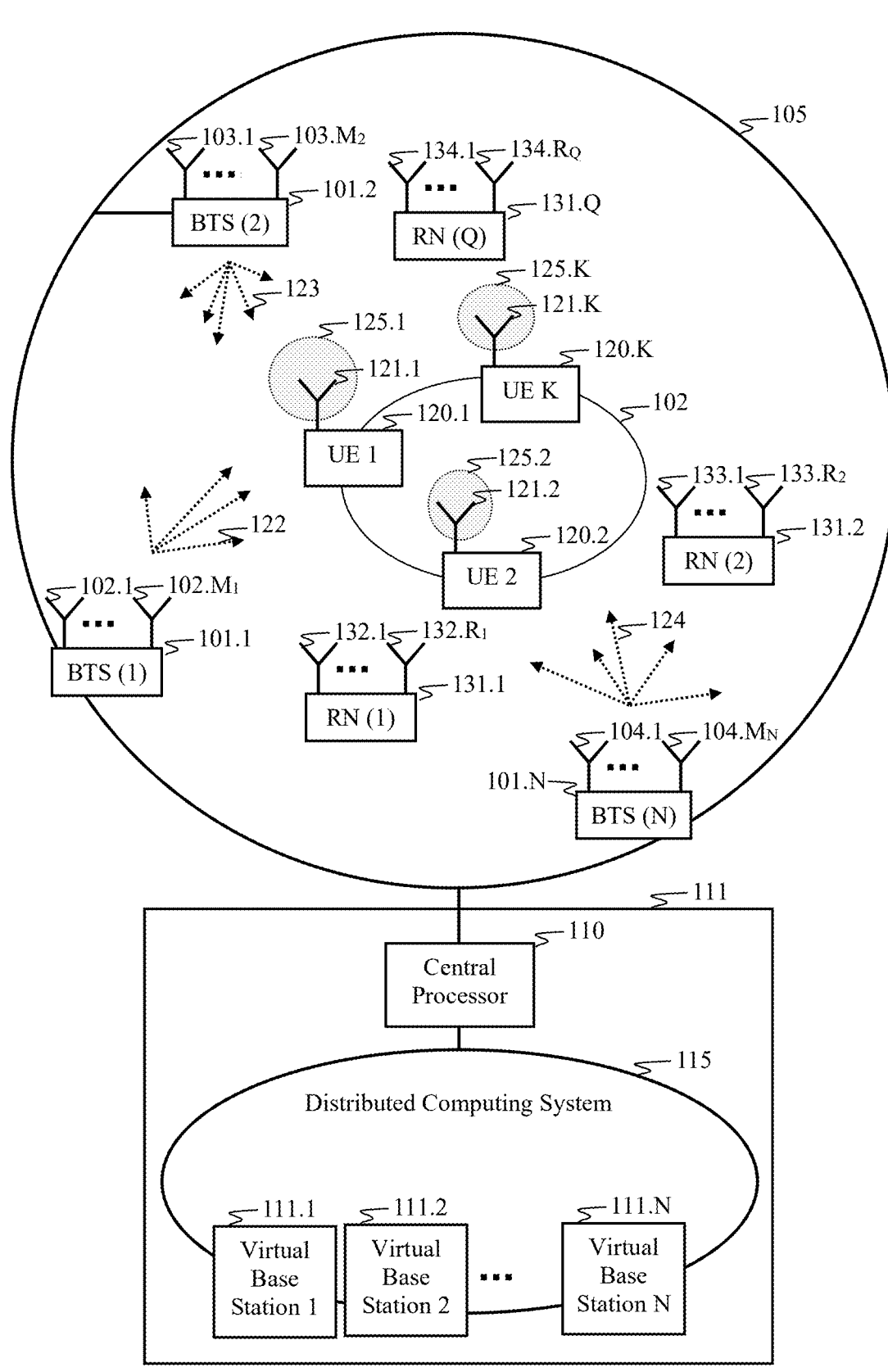
FIG. 1 illustrates an exemplary communication system in which aspects of the disclosure can be employed.

FIG. 1 illustrates an exemplary communication system in which aspects of the disclosure can be employed with any of the signaling formats, networks, transmission protocols, use cases, and aspects mentioned herein. The system may include one or more BTSs 101.1-101.N, which are also referred to as evolved NodeBs (eNBs), 5G NodeBs (gNBs), X NodeBs (xNBs) (wherein "X" refers to further enhancements and/or evolution of the 3GPP network), access points, wireless network managers, small cells, pico cells, network nodes, radio access network (RAN) devices, network controllers, data aggregation points (DAPs), and the like. A wireless device may be a BTS. Any of these terminologies may be used interchangeably. It should be appreciated that one or more of the BTSs may operate cooperatively, such as to perform Cooperative-MIMO, Cloud computing, coordinated multipoint, and the like. It should be appreciated that a wireless network manager can include a master device in a cluster of devices (such as airborne devices, other mobile devices, wireless personal area network devices, devices in a media ecosystem, and the like). One or more UEs 120.1-120.K may include one or more antennas, and may comprise local communication links with other devices to effect Cooperative-MIMO, relay, D2D, peer-to-peer, and the like. A UE may also be referred to as a mobile station, a mobile, a terminal, a user, a subscriber, a sensor, an IoT device, and the like. A wireless device may be a UE. The communication system may also include relay nodes (RN) 131.1-131.Q capable of utilizing a portion of RAN resources to improve coverage and/or overall performance of the system. A wireless device may be a relay. UEs may function as relay nodes. In mm Wave for 5G Ultra Dense, relays using techniques disclosed herein can extend coverage that is otherwise impeded by penetration loss, shadowing, transmission power constraints, and the like. A relay may employ mm Wave for one link and a different frequency band for other links. For example, a relay that establishes a link with a mmWave BTS might employ sub-5 GHz to link with one or more UEs, such as to penetrate buildings or foliage, mitigate other channel impairments, or extend range. Groups of UEs may self-organize into cooperative clusters, wherein at least one UE functions as a relay linked to a BTS.

The non-limiting term "network node" or "node" can refer to any type of network node serving a UE and/or connected to other network nodes or networks. Network nodes can also comprise multiple antennas for performing various operations (e.g., MIMO, transmit or receive diversity, beamforming, and codebook-based precoding. The network node can include multi-standard radio (MSR) devices, comprising: an MSR BS, an eNodeB, a network controller, a radio network controller (RNC), a base station controller (BSC), a relay, a donor node controlling relay, a BTS, a transmission point, a transmission node, an RRU, an RRH, a distributed antenna system (DAS), and the like. A network node can be connected to the one or more communication service provider networks via one or more backhaul links 105. For example, the one or more backhaul links 105 can comprise wired and/or wireless link components, an optical fiber backbone, a network fabric, a coaxial cable, and the like.

The wireless communication system can employ various cellular technologies and modulation schemes to facilitate wireless radio communications between devices. For example, the communication system can employ code division multiple access (CDMA), time division multiple access (TDMA), frequency division multiple access (FDMA), multi-carrier code division multiple access (MC-CDMA), single-carrier code division multiple access (SC-CDMA), SC-FDMA, orthogonal frequency division multiplexing (OFDM), DFT-s-OFDM, Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-s-OFDM), cyclic prefix OFDM (CP-OFDM), Carrier Interferometry (CI), and/or resource-block-filtered OFDM. In various aspects, the communication system can be configured to provide 5G, beyond-5G, 5G-Advanced, 5.5G, 6G, etc., features and functionalities. Disclosed aspects can utilize high frequencies (e.g., >6 GHz), such as millimeter wave, microwave, infrared, and/or visible spectrum.

Disclosed aspects can employ or be configured to perform artificial intelligence (AI) operations, including Machine Learning (ML), such as Deep Neural Network (DNN) processes, to adapt signaling and/or networking parameters. There may be multiple adapting devices, each responsible for a different task. Alternatively, adapting devices may operate cooperatively to employ distributed and cooperative learning.

Figure 2A:
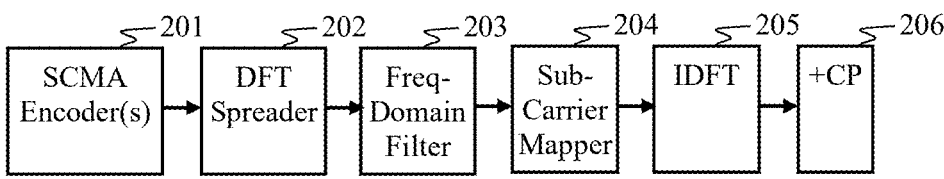
FIG. 2A is a block diagram of a radio terminal in which exemplary aspects of the disclosure can be implemented. Aspects of the disclosure are not limited to the depicted terminal design, as such aspects can be implemented in alternative devices, configurations, and applications.

FIG. 2A is a block diagram of a wireless device (e.g., radio terminal) in which exemplary aspects of the disclosure can be implemented. At least one bits-to-symbols encoder 201 (an SCMA encoder is one possible example) provides codewords or data symbols to a DFT-s-OFDM spreader 202, which generates a set of DFT-s-OFDM symbols. An optional frequency-domain filter 203 may perform frequency-domain pulse-shaping (e.g., with a selectable pulse shape, or roll-off factor) to effect PAPR-reduction in the time domain via time-domain pulse shaping. Since pulse shaping 203 is in the same domain (i.e., frequency domain) as the DFT-spreading 202, the pulse shaping 203 can be referred to as providing a spreading code roll-off factor. A sub-carrier mapper 204 (also referred to as a tone mapper) maps the DFT-s-OFDM symbols to OFDM subcarriers that are scheduled for use by the radio terminal. For example, the mapper 204 may map the DFT-s-OFDM symbols to frequency bins of an IDFT (e.g., IFFT) 205, which generates a discrete-time OFDM signal by modulating the DFT-s-OFDM symbols onto the selected OFDM subcarriers. Optionally, a cyclic prefix may be appended 206. The DFT-s-OFDM spreader 202 provides the discrete-time OFDM signal with low PAPR (i.e., PAPR that is lower than if the DFT-s-OFDM spreader 202 is not used), and the PAPR can be adapted via pulse-shaping effected by the pulse-shaping filter 203.

The pulse-shaping filter 203 can employ a spreading code roll-off factor selected as a function of occupancy or availability of a resource in the communication link. The resource can comprise any resources that provide for multiple-access communications, such as spectral resources (e.g., PRBs, OFDM subcarriers), multiple-access code spaces, power-domain resources, and/or spatial layers (e.g., spatial sub-channels, polarization channels, or beams). In some aspects, the spreading code roll-off factor can be a function of a power-efficiency criterion for the wireless device.

SCMA is an encoding technique that encodes data streams, such as binary data streams, or in general, M-ary data streams, where M is an integer number greater than or equal to 2, into multidimensional codewords. Channel coding (not shown) may be employed before the encoding 201. SCMA encoder 201 can directly encode the data stream into multidimensional codewords and may circumvent quadrature amplitude modulation (QAM) symbol mapping, which may lead to coding gain over conventional CDMA (and low-density sequence (LDS)) encoding. In some aspects, encoder 201 may be a resource spread multiple access (RSMA) encoder, a power-domain multiple access (PDMA) encoder, a pattern division multiple access (pDMA) encoder, or some other NOMA encoder.

The SCMA encoding 201 can provide multiple access via the use of different codebooks for different multiplexed layers. Furthermore, SCMA encoding 201 typically uses codebooks with sparse codewords that enable receivers to use low-complexity algorithms, such as MPAs, to detect respective codewords from combined codewords received by the receiver, thereby reducing processing.

Figure 2B:
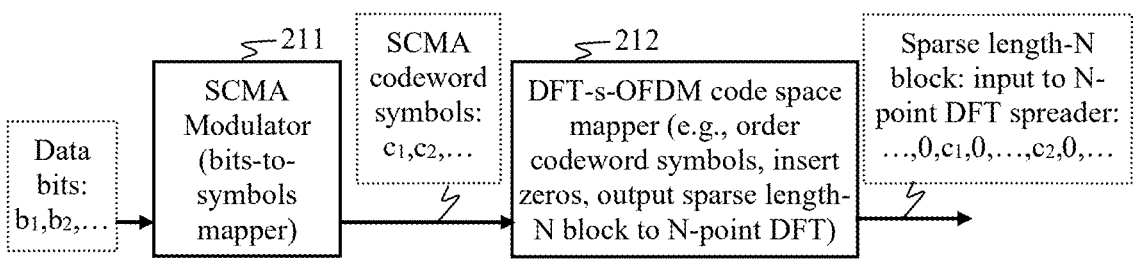
FIG. 2B is a block diagram depicting functional aspects of an SCMA encoder, and which can be implemented as a method, as software instructions residing on non-transitory computer-readable media, or in hardware.

While typical SCMA achieves spreading via its multidimensional codewords, whose elements are modulated onto individual subcarriers, the radio terminal in FIG. 2A employs DFT-spreading to spread each SCMA codeword element over multiple OFDM tones. As depicted in FIG. 2B, the encoder 201 can comprise a NOMA modulator 211, such as an SCMA modulator configured to map input data bits $(b_1, b_2, \ldots)$ to a set of SCMA codeword symbols $(c_1, c_2, \ldots)$, and a DFT-s-OFDM code-space mapper 212 configured to map the symbols to a sparse DFT-s-OFDM code space in a DFT-s-OFDM symbol. A sparse orthogonal DFT-s-OFDM code space is a DFT-s-OFDM code space that has fewer than the total number of orthogonal DFT-s-OFDM codes in a DFT-s-OFDM symbol. For example, the mapper 212 might arrange the symbols $(c_1, c_2, \ldots)$ in an order corresponding to the SCMA codeword, and insert zeros ahead of, between, and/or behind the ordered codeword symbols $(c_1, c_2, \ldots)$ according to the layer's sparsity pattern, for example, to produce a sparse length-N block of symbols, which is input to a length-N DFT spreader 202. At least a second layer having (e.g., assigned to) a different sparsity pattern may be mapped to a different sparse code space in the same OFDM symbol (e.g., occupying the same set of PRBs), such as by the same wireless device or a different wireless device. The multiple sparse code spaces can be orthogonal or non-orthogonal to each other. Optionally, the mapper 212 might map the sparse DFT-s-OFDM code space to a code-space subset of the DFT-s-OFDM symbol's full code space (e.g., the full subspace may be partitioned into multiple OMA code spaces, or subsets, and each layer may be assigned to a particular subset). Code-space subsets may be orthogonal to each other.

The output of the DFT spreader 202 generally has less sparsity (i.e., is more dense) than its input, which means that for a given number of non-zero SCMA codeword symbols $(c_1, c_2, \ldots)$, a greater number of spread symbols may be modulated 205 onto OFDM tones, which increases frequency diversity. At the receiver, DFT-despreading can convert the received dense signal to sparse codewords having the same sparsity pattern(s) as the transmitted SCMA codeword(s). This provides simultaneous benefits of improved frequency diversity and low-complexity reception. Furthermore, the sparsity in the DFT-s-OFDM code space enables multiple access across the same tones in the same OFDM symbol interval. For example, N-point DFT spreading can provide up to N orthogonal DFT-s-OFDM codes (or more than N quasi-orthogonal codes), depending on the pulse-shaping 203, and each DFT-s-OFDM code can be spread across at least N OFDM tones. As N increases, frequency diversity increases without sacrificing the number of multiple-access channels in a given OFDM symbol duration. This enables low PAPR and provides a processing gain that is not necessarily coupled to the number of non-zero elements in a codeword. However, the aspects disclosed herein are not limited to particular benefits or advantages.

In one aspect, mapper 212 might arrange the codeword symbols $(c_1, c_2, \dots )$ in an order corresponding to the SCMA codeword, and insert zeros ahead of, between, and/or behind the ordered codeword symbols $(c_1, c_2, \dots )$ corresponding to the SCMA codeword to produce a sparse length-N block of SCMA codeword symbols. DFT spreader 202 may perform first spreading on the SCMA codeword symbols using a covering-code transform (which transforms or modulates SCMA codeword symbols to particular covering codes) or an orthogonal matrix (such as a Walsh transform or other orthogonal matrix transform, which modulates SCMA codeword symbols onto particular orthonormal vectors) to produce a length-N block of first spread symbols. The first spread symbols might be dense (i.e., have less sparsity than the length-N block of SCMA codeword symbols), which can reduce the PAPR of the discrete-time OFDM signal produced by the IDFT 205. In one aspect, an n'-point transform (n'<N) produces the first spread symbols, which is sparse (i.e., n'<N non-zero symbols), wherein the n' non-zero spread symbols may be arranged in a block of consecutive symbols to reduce the PAPR of the discrete-time OFDM signal produced by the IDFT 205. The mapper 212 may perform zero insertion on the spread symbols (e.g., insert N-n' zeros) to produce a length-N block of first spread symbols, which is input to length-N DFT spreader 202. A corresponding receiver might perform complementary operations in reverse order to those of the transmitter, such as OFDM demodulation (IFFT), subcarrier de-mapping, DFT-s-OFDM de-spreading followed by de-spreading first spread symbols, and then NOMA reception. In some aspects, depending on the roll-off of the filter, the dimension of the DFT spreader 202 might be made larger than the number N of DFT-s-OFDM code spaces, or the number of DFT-s-OFDM code spaces might be made less than N.

Sparsity of the SCMA codewords can help reduce the complexity of joint detection of multiplexed SCMA layers by enabling MPA in the receiver. In general, each layer of SCMA has its specific codebook set. Some aspects disclosed herein can provide for low density spreading. Different layers of data can be multiplexed into each DFT-s-OFDM symbol, wherein each layer employs an SCMA codeword (or set of codewords) with zero-value elements such that each layer uses fewer than the total number of DFT-s-OFDM codes in the DFT spreader 202. In some aspects, the SCMA encoder 201 can map each codeword over multiple DFT-s-OFDM symbols, wherein a layer's codeword elements mapped in each DFT-s-OFDM symbol employ fewer than the total number of DFT-s-OFDM codes. In some aspects, multiple codewords corresponding to a layer may be mapped to a single DFT-s-OFDM symbol, wherein the layer employs fewer than the total number of DFT-s-OFDM codes. A mapping can comprise a linear transformation. A mapper can comprise a linear transform.

Figure 3:
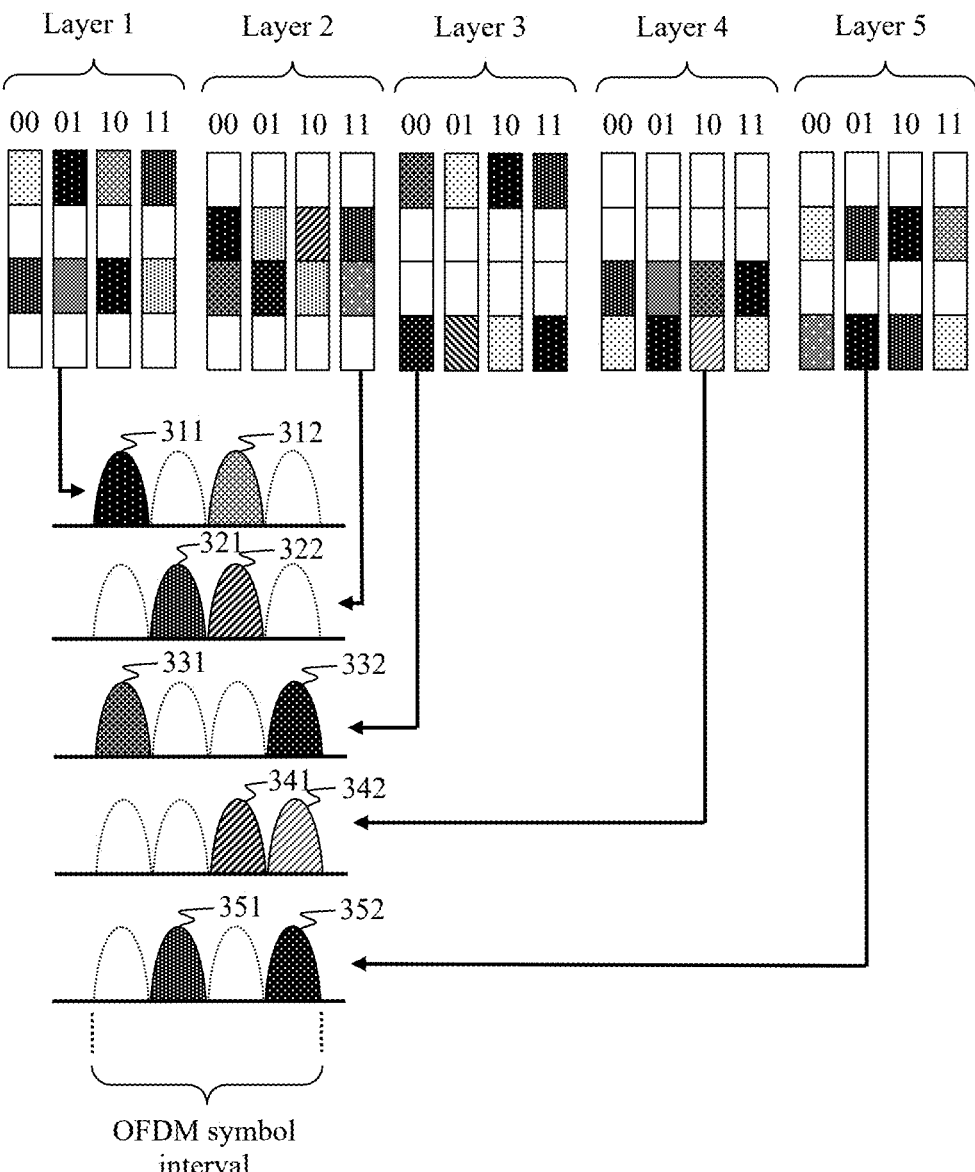
FIG. 3 depicts an exemplary multiplexing scheme wherein each of a plurality of layers is mapped to a different sparse DFT-s-OFDM code space in the same DFT-s-OFDM symbol. The sparse code spaces can overlap, thus providing for overloading of the full DFT-s-OFDM symbol code space.

FIG. 3 depicts an exemplary NOMA multiplexing scheme, which may use a plurality of codebooks, such as a codebook depicted by the set of rectangular blocks associated with each layer (Layers 1-5). Each codebook comprises a plurality of multidimensional codewords (which provide for spreading across multiple sparse DFT-s-OFDM code spaces, as disclosed herein). Each column represents a codeword corresponding to a data value shown at the top of the column. Each codeword of a respective codebook may be mapped to a different data value. As an illustrative example, the first codeword (i.e., column) in each of the codebooks associated with Layers 1-5 is mapped to binary value '00'. Similarly, the second codewords are mapped to the binary value '01', the third codewords are mapped to the binary value '10', and the fourth codewords are mapped to the binary value '11'. Although the codebooks in FIG. 3 are depicted as comprising four codewords each, SCMA codebooks may have any number of codewords. As an example, SCMA codebooks may have 8 codewords (e.g., mapped to binary values '000' . . . '111'), 16 codewords (e.g., mapped to binary values '0000' . . . '1111'), or more. Similarly, codewords may comprise any plurality of elements.

In LDS, the multidimensional codewords are low-density sequence signatures. For example, each codeword in FIG. 3 can comprise a plurality of non-zero elements (depicted as shaded blocks) and a plurality of zero-value elements (depicted as unshaded blocks). The different shades correspond to different element values. Each of the multidimensional codewords may comprise any plurality of non-zero elements and any plurality of zero-value elements.

Each codebook of the plurality of codebooks can be assigned to a different multiplexed layer (e.g., Layers 1-5). In one aspect, each of the plurality of codebooks is employed by a different UE. However, in some aspects, multiple UEs may employ the same codebook. UEs employing the same codebook may be scheduled in a manner that enables a BTS (for example) to separate interfering transmissions therefrom. The UEs and/or the RAN may provide for assigning the codebooks to the UEs. A UE, a BTS, or a relay may employ multiple codebooks, each associated with a different layer.

Different codewords may be selected from various codebooks of corresponding Layers 1-5 depending on the binary data to be transmitted over a multiplexed layer. In this example, the second codeword is selected from Layer 1's codebook because the binary value '01' is being transmitted over the first multiplexed layer. Furthermore, the fourth codeword is selected from Layer 2's codebook, the first codeword is selected from Layer 3's codebook, the third codeword is selected from Layer 4's codebook, and the second codeword is selected from Layer 5's codebook. In some aspects, the codewords may be multiplexed together to form a multiplexed data stream, which is transmitted over shared resources. In other aspects, separate devices (each corresponding to one of the Layers 1-5) individually modulate the codewords onto resources allocated to each device, and the resources may be shared by multiple ones of the separate devices. Thus, individual transmissions from the separate devices can produce a multiplexed data stream when received by a receiver (such as a BTS, relay, or UE). The codewords can comprise sparse codewords, and therefore can be identified upon reception of a multiplexed data stream using a low complexity algorithm, such as an MPA, TD, SIC, MLE, or an ANN.

The codeword selected from each layer's codebook is modulated, or mapped, onto a DFT-s-OFDM code space, which can comprise one or more DFT-s-OFDM codes. In the aspect depicted herein, each code space comprises a single DFT-s-OFDM code, and only the non-zero elements are mapped to codes. For example, the first and third codeword elements of Layer 1 are mapped to first and third codes, respectively, to generate modulated code spaces 311 and 312; the second and third codeword elements of Layer 2 are mapped to second and third codes, respectively, to generate modulated code spaces 321 and 322; the first and fourth codeword elements of Layer 3 are mapped to first and fourth codes, respectively, to generate modulated code spaces 331 and 332; the third and fourth codeword elements of Layer 4 are mapped to third and fourth codes, respectively, to generate modulated code spaces 341 and 342; and the second and fourth codeword elements of Layer 5 are mapped to second and fourth codes, respectively, to generate modulated code spaces 351 and 352. The modulated code spaces may be transmitted separately (e.g., in the uplink) or aggregated into a multiplexed signal prior to transmission (e.g., in the downlink).

In accordance with some aspects of the disclosure, each code space corresponds to at least one of a plurality of DFT-s-OFDM spreading codes that spreads a symbol value across the same plurality of PRBs. Modulated code spaces 311 and 312 can be transmitted as DFT-s-OFDM signals that occupy the same subcarriers in the same OFDM symbol interval as the modulated code spaces 321, 322, 331, 332, 341, 342, 351, and 352. In this example, the DFT-s-OFDM spreading, not the SCMA codes, provide for spreading across OFDM subcarriers.

An SCMA encoder can map data bits (which may be coded bits) into the multi-dimensional SCMA codeword $x_k$, where $x_k=(x_{1k}, x_{2k}, \ldots, x_{Nk})^T$ is an N-dimensional signal constellation point. The SCMA encoder may reside in a kth UE, for example, in an uplink grant-free SCMA system with K potential UEs in the network, the UEs being active or inactive. For sparse codewords, only a subset of the available (e.g., N) dimensions is used to transmit non-zero symbols. For N subcarriers, the full DFT-s-OFDM code space has up to N orthogonal codes (i.e., dimensions), or possibly more if quasi-orthogonal codes are used.

Each non-zero symbol can be modulated onto a DFT-s-OFDM code. This spreads each non-zero symbol across all the subcarriers, wherein the multiple subcarriers can simultaneously be shared with other layers, and possibly without interference if DFT-s-OFDM code division OMA is employed. This can help mitigate the effects of deep fades, narrowband interference, and other channel impairments. Instead of attempting to resolve collisions between OFDM subcarriers, as in SCMA-OFDM, disclosed techniques can resolve collisions between DFT-s-OFDM code spaces. The receiver can employ an MPA, TD, SIC, MLE, or an ANN in the code-space domain. The receiver may or may not employ a frequency-domain equalizer. At the receiver, any of various multi-user detectors (MUDs) can decode the data for each active user. Based on the observation signal y, as well as pilot symbols, an SCMA decoder can search for the maximum a posteriori (MAP) estimation for each coded bit:

$$c_{kl}=\arg \max p(c_{kl}|y)$$

where $c_{kl}$ is the $l^{th}$ coded bits for user k. One solution is to formulate a factor graph representation of SCMA and calculate the probability of each variable iteratively.

The DFT-s-OFDM codes in a given OFDM symbol interval may be orthogonal or quasi-orthogonal. In one aspect, a block of OFDM subcarriers might resemble a Rectangle function in the frequency domain, and the IDFT of this function produces a discrete-time signal expressed by a Sinc function. Each DFT-s-OFDM code provides a set of phases to the subcarriers, and the phase offsets between the different frequency-domain codes are transformed to time offsets (specifically, cyclic shifts) in the discrete-time signal.

By way of example, each code space depicted in FIG. 3 can represent the mainlobe of the real part of its corresponding Sinc function (or some other pulse shape). The trailing zero crossing on the first mainlobe corresponds to the leading zero crossing of the second mainlobe. The third and fourth mainlobes are similarly positioned such that four mainlobes fit within the OFDM symbol interval or a partition (such as one of a set of orthogonal code-space partitions) thereof. In this case, the mainlobe width defined by its pair of corresponding zero crossings equals the OFDM symbol interval divided by the number of subcarriers. For an increased number of subcarriers, the Rectangle function is larger, which means the Sinc function's mainlobe is smaller, so more mainlobes fit inside the OFDM symbol interval, which corresponds to an increased number of orthogonal DFT-s-OFDM codes.

Figure 2C:
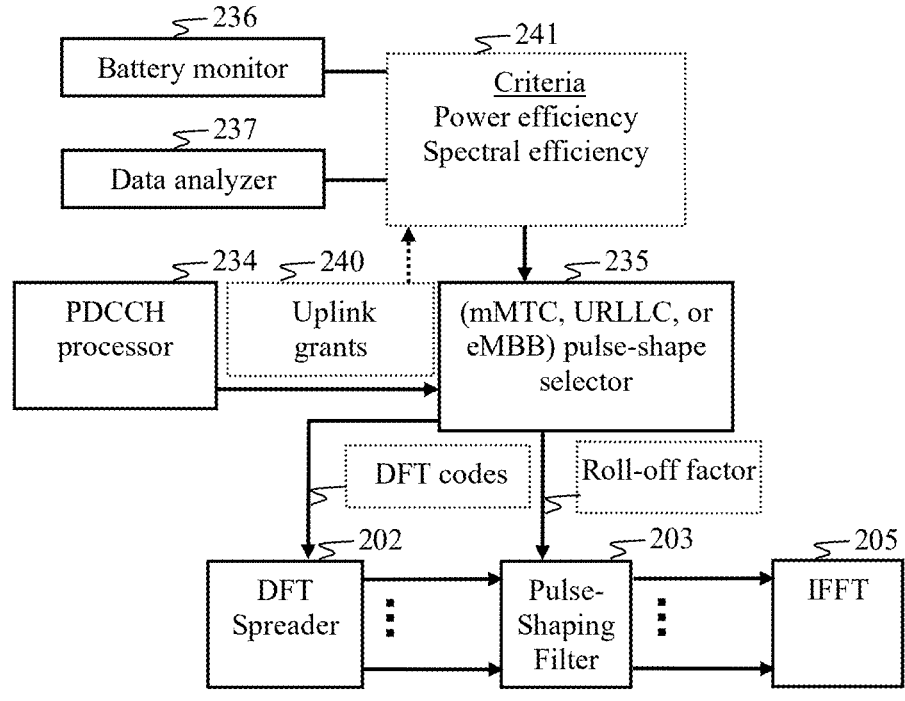
FIG. 2C is a block diagram depicting a processor architecture that can be programmed in accordance with aspects disclosed herein.

In FIG. 2C, a wireless device comprises one or more situational-awareness systems, such as device monitors to analyze the device's power state and/or system monitors to determine the RAN's spectrum occupancy/availability. A battery monitor 236 can monitor power draw or remaining battery charge, which can be used in a power efficiency criterion 241 input to a pulse-shape selector 235 to determine the need for power savings and select a spreading code roll-off factor. Other situational-awareness systems (not shown) may provide other power efficiency and/or spectral efficiency criteria 241 (such as based on CSI, channel quality index, RSS, error-rate measurement, etc.) to the selector 235, which can compute or select the roll-off factor therefrom. A control-signal processor (such as PDCCH processor 234) communicatively coupled to the selector 235 may provide network control information, such as control messages transmitted to the device and/or other devices. The selector 235 may, from the network control information, determine power efficiency and/or spectral efficiency criteria. The selector 235 may infer network state information from the control messages, such as network congestion, number of active UEs, UE geographical density, availability of network resources, etc., and use this information to determine whether to employ power-efficient and/or bandwidth-efficient access, such as via roll-off selection. The selector 235 may select a power-efficient and/or bandwidth-efficient access technique based on the amount of data to be transmitted (such as by measuring data-buffer occupancy of the device) and/or the type of data service employed by the device (e.g., via data analyzer 237).

The selector 235 controls parameter selection for either or both the DFT spreader 202 and the frequency-domain pulse-shaping filter 203 to shape the transmitted waveform. For example, the selector 235 may select code spaces or re-provision the codes based on SCMA codes, code orthogonality, and/or to adapt locations of the code-space zero crossings in response to pulse-shaping 203. The selector 235 may select the frequency-domain pulse shape in order to provide for an advantageous trade-off between low PAPR and spectral efficiency.

FIG. 4A is a block diagram of a receiver configured according to some aspects of the disclosure. A cyclic prefix remover 401 may remove a cyclic prefix from a received baseband signal. An OFDM demodulator, such as a DFT 402, demodulates the discrete-time baseband signal and generates received symbol values corresponding to OFDM subcarriers, and may channelize the received symbol values. An equalizer 403 may equalize the received symbol values. A matched frequency-domain pulse-shaping filter 404 may operate on the (equalized) received symbol values prior to despreading by a DFT-s-OFDM despreader, such as an IDFT 405. The resulting de-spread data may be decoded in a NOMA (e.g., SCMA) decoder 406. In some aspects, at least some blocks in FIG. 4A can be understood to have corresponding complementary blocks depicted in FIG. 2A.

The receiver may reside in a BTS or UE. The receiver may provide for multiple-access demultiplexing to separate data streams received from different transmitters or layers into multiple received layers. The layers may be demultiplexed with respect to spatial demultiplexing, time-division multiplexing, code division multiplexing, and/or frequency division multiplexing. Thus, one or more of the blocks in FIG. 4A may comprise a plurality of processing elements, each element configured to process a different set of layers.

In some aspects, the NOMA decoder 406 employs an MPA. The NOMA decoder 406 may employ a deterministic MPA, a stochastic MPA, weighted message passing, a pruned tree structure approximation, sphere decoding MPA (including list sphere decoding MPA), deep learning neural network SCMA detector (e.g., decoder methods, such as passing messages between variable nodes and function nodes to detect received signals might be replaced with propagations in a deep neural network), successive cancellation decoding, successive cancellation list decoding, and/or multi-user decoding.

In some aspects, the performance of SCMA systems can be improved by channel coding, e.g., turbo and LDPC codes. A turbo principle with an iterative multiuser receiver may be employed. In some aspects, polar codes may be employed. Successive cancellation list decoding of polar codes may be employed by the decoder. Polar codes may comprise bit-interleaved polar coded modulation (BIPCM) or multilevel polar coding (MLPC), for example. At the receiver, MLPC decodes the bit levels sequentially, with information gained when decoding earlier levels used to make decisions at later levels. In BIPCM, a single polar decoder is used to jointly decode the bits. Decoding may be performed in a concatenated manner based on nonbinary message passing algorithm detection.

FIG. 4B is a block diagram of a receiver configured in accordance with aspects of the disclosure. While this receiver might typically be employed in a BTS, it can be used in other network nodes, such as UEs and relay nodes. A scheduler 451 is communicatively coupled to a code-space/pulse-shape selector 452, which can be communicatively coupled to either or both the matched filter 404 and the IDFT de-spreader 405. The scheduler 451 may also be communicatively coupled to a downlink control channel (e.g., PDCCH) processor 434 for communicating uplink grants and associated modulation and coding information (MCI) to UEs. Code space and/or pulse-shape information may be communicated from the selector 452 to the processor 434, and added to uplink grants.

The UE scheduler 451 may be responsive to resource requests from UEs, and the selector 452 may be responsive to measurements of the UE's environment (such as CSI, link quality, SNR, BER, RSS, etc.), UE operating parameters (such as buffer status reports (BSRs), battery charge, battery power, power consumption, power efficiency, etc.), UE type, type of communication service, and/or requests by the UEs to employ a particular pulse shape. The selector 452 may rank UEs requesting services based on bandwidth efficiency and power efficiency criteria, possibly determining an optimal trade-off. The selector 452 might determine how many (and which) UEs to schedule a power-efficient pulse type, and how many (and which) to schedule a spectral-efficient pulse type. The selector 452 may determine a budget for power efficiency based grants, rank the UEs based on power-efficiency criteria (computed by the eNB or the UE), and assign power-efficient pulse shapes to the highest ranked UEs. This information may be used by the scheduler to provision PRBs in the uplink grants. Pulse-shape (e.g., spreading code roll-off) and DFT-s-OFDM code-space grants may be transmitted along with uplink grant, such as in the MCI.

Parameters in an uplink grant (e.g., the number of PRBs, interleaving factor, roll-off, etc.) may be used by the matched filter 404, to adapt filter weights. The IDFT de-spreader 405 can employ uplink grant information, which can include code-space information, to de-spread the received signals and demultiplex layers. Each layer may be granted less than the total set of DFT-s-OFDM codes in an OFDM symbol interval, which can enable multiple layers to be multiplexed into (and demultiplexed from) the same PRBs. DFT-s-OFDM code space assignments may be based on BSRs, types of service, geographical distribution of UEs, pulse shapes, and/or other factors.

In some aspects, each layer may have a sparsity pattern that identifies that layer, so those patterns may be scheduled as corresponding DFT-s-OFDM code spaces. Then NOMA (e.g., SCMA) symbols generated from data for each layer are transmitted in the layer's corresponding code space. Code-space demultiplexing performed by the despreader 405 at least partially demultiplexes the layers. Decoder 406 completes the demultiplexing and determines the data transmitted in each code space.

In other aspects, each layer is assigned a unique identity symbol value that identifies that layer's signals in a group of received signals, and which may be provisioned via an uplink grant from the scheduler 451. The different identity symbol values provide for multiple access when multiple layers transmit the same data (or when different transmitted data have overlapping code spaces). Different NOMA (e.g., SCMA) data symbols generated from data can be assigned to and transmitted as unique DFT-s-OFDM code spaces. Thus, each layer transmits its unique identity symbol, and the data is conveyed by the code spaces in which the unique identity symbol is transmitted. Code-space demultiplexing performed by the despreader 405 at least partially determines which data was transmitted. Decoder 406 completes the determination of which data was transmitted, and further determines which layer (i.e., identity symbol) transmitted the data.

FIG. 5A illustrates a set of selectable frequency-domain pulse shape functions, and FIG. 5B illustrates corresponding time-domain pulse shapes. Pulse shape selectors 235 and 452 can be configured to select a pulse-shaping parameter (such as a roll-off factor $\beta$) to provide a particular PAPR reduction. For example, filter 203 and/or 404 may be provided with a tunable roll-off factor for raised-cosine, root-raised cosine, Gaussian, parametric linear pulse, or other filter shapes that employ different roll-off factors (or similar parameters), such as to effect a change in the pulse shape of the corresponding discrete-time signal. Some pulse-shaping filters, such as generalized raised cosine filters, K-exponential filters, and filters that produce linear combinations of pulses, can provide an additional design parameter, giving an additional degree of freedom for minimizing PAPR for a given roll-off factor. As used herein, the term "roll-off factor" or "pulse-shaping parameter" can include such additional design parameters.

Frequency-domain filter functions corresponding to a set of roll-off factors $\beta$ are illustrated, including conventional OFDM Rectangle ($\beta=0$) 501 and full roll-off ($\beta=1$) 502. A filter function employed by filter 203 scales the OFDM subcarriers (or symbols modulated onto the subcarriers) by sample values of the filter function corresponding to the respective subcarrier frequencies. For example, filter function 502 provides sample values 500.1 and 500.2 corresponding to subcarrier frequencies $f_1$ and $f_2$. Most of the power lies within the Nyquist band ($-0.5f_s$ to $0.5f_s$), e.g., $f_{-N/2}$ to $f_{N/2}$, and for any value of $\beta$, the curves cross at the same points $f_{\pm N/2}$. For larger values of $\beta$, there is less ringing in the corresponding time-domain signals (shown in FIG. 5B), but more spectrum (e.g., OFDM subcarriers) is needed to achieve this result. It should be appreciated that frequency-domain filter functions can be configured to shape LFDMA or IFDMA signals.

FIG. 11 illustrates code spaces, as may be representative of corresponding time-domain signals (e.g., pulse waveforms), such as depicted in FIG. 5B. The pulses overlap, but only the sampled symbol (i.e., code) at each pulse center (e.g., at t=0 in FIG. 5B) contributes to the response at the sampling instant, as the other pulses are zero. The raised-cosine filters fulfill the Nyquist inter-symbol interference (ISI) criterion that only the sampled symbol contributes to the signal. All other encoded symbols are zero at the sampling points. While reduced ringing can reduce the PAPR of the spread signal to improve power efficiency (at the cost of some spectral efficiency), it can also reduce ISI, which can compensate for at least some of the spectral efficiency trade-off. This is because, in practice, a receiver does not sample exactly at the required point in time (e.g., at t=0) where no ISI occurs, so there is always some ISI that induces errors in the interpretation of the signal.

In FIG. 5A, the different filter functions have different bandwidths, and thus can require different subcarrier allocations when resources are scheduled. For example, in the case of filter function 501, a total of N subcarriers might be scheduled in an uplink resource grant, whereas in the case of filter function 502, up to 2N subcarriers might be scheduled. The corresponding time-domain signals depicted in FIG. 5B have the same pulse width as measured from the zero-crossings of the mainlobe. The pulse width indicates the number of symbols (e.g., orthogonal code spaces) that can be modulated in each OFDM symbol interval. Thus, filter function 501 provides a higher spectral efficiency than filter function 502.

In some aspects, the different filter functions can have the same bandwidth (unlike the filter functions shown in FIG. 5A). In such aspects, the UE may be assigned a fixed amount of spectrum or subcarriers (e.g., PRBs), and the UE or the BTS may select the pulse shape with respect to criteria imposed by the fixed set of resources (such as with respect to subcarrier number, spacing, and/or bandwidth). The corresponding time-domain pulse shapes (in contrast to those depicted in FIG. 5B) have different pulse widths as measured from the zero-crossings of the mainlobe. The pulse widths indicate the possible number of orthogonal code spaces that can be employed, wherein narrower pulses generally correspond to a larger number of orthogonal code spaces. In some aspects, a set of possible pulse shapes are provided wherein each pulse shape has a pulse width that provides for an integer number of time-domain pulses to fit orthogonally in the OFDM symbol interval. For example, roll-off factors may be computed to provide this property. In some aspects, for each pulse shape employed in the filter 203, a corresponding set of orthogonal (or quasi-orthogonal) codes is provisioned in the DFT spreader 202. Similarly, for each pulse shape employed in the matched frequency-domain pulse-shaping filter 404, a corresponding set of orthogonal (or quasi-orthogonal) codes is provisioned in the IDFT de-spreader 405.

In some aspects, the spectral efficiency cost and PAPR-reduction benefit can be computed (by either or both the UE and the BTS) in order to select a pulse shape and the amount of resources in a resource grant. For example, additional resources may be granted to a UE to be used for pulse shaping. In some aspects, the UE can compute the trade-off of reducing data rate (and possibly, increasing the effective latency of transmitting a full message) in order to select a pulse shape that provides a lower PAPR. For example, if the UE receives an uplink grant with a fixed amount of resources (e.g., subcarriers), the UE can decide how to use those resources by selecting spectral/power efficiency trade-off via pulse-shape selection. For example, the UE may provision a number of data symbols in each OFDM symbol that is fewer than the number of subcarriers in the grant. The UE may select the code spaces in the DFT spreader 202 to provide for a predetermined code-space orthogonality. Complementary adaptations can be made to the matched filter 404 and the de-spreader 405, such as with respect to pulse-shaping and code-space configuration and/or selection.

The UE may adaptively select its pulse shape or always use the same pulse shape in a grant-free or a grant-based access scheme. In some aspects, the UE employs a predetermined pulse-shape (e.g., roll-off) corresponding to the type of UE and/or service. For example, an IoT device, a navigation device, and a cellular handset may each employ a different pulse shape (or set of pulse shapes). An enhanced mobile broadband service, an ultra-reliable low-latency communications service, and a massive machine type communications service may each employ a different pulse shape (or set of pulse shapes). A BTS (or other device) may implicitly know the pulse shape based on at least one of the UE device type and service. In some aspects, the BTS (or other device) implicitly knows the pulse shape based on the amount of data to be transmitted (such as reported in a BSR) and the amount of resources granted to the UE. In some aspects, the BTS sends a pulse shape selection message to the UE instructing the UE to use a particular pulse shape (or set of pulse shapes). In other aspects, the UE sends a pulse shape selection message to the BTS as to which pulse shape the UE selects.

FIG. 6A is a block diagram that depicts a processor and processing operations in accordance with some aspects of the disclosure. An uplink control-channel processor, such as PUCCH processor 601, upon receiving data to be transmitted, transmits a scheduling request (and optionally, a pulse-shaping request) on the uplink control channel. The pulse-shaping request may comprise a proposed pulse shape determined by the wireless device (e.g., UE), which might be based on spectral resources available in the wireless network, power limitations of the wireless device, CSI, and/or other environment, device, and/or network conditions. Alternatively, the pulse-shaping request might comprise wireless device information and/or measurements of the network by the wireless device, which the BTS can use to select a pulse shape for the UE. A downlink control-channel processor, such as a PDCCH processor 602 receives a scheduling grant, which can include an uplink grant and (optionally) a pulse-shaping grant. The uplink grant is communicated to an uplink traffic channel processor, such as a PUSCH processor 603, which synthesizes the transmission signal to be transmitted in the network. The pulse-shaping grant may be an explicit grant, such as a roll-off factor, or an implicit grant, such as excess resources relative to the amount of data to be transmitted per the BSR and the MCI. The pulse shape information is conveyed to the PUSCH processor 603, which receives the data to be transmitted (e.g., from a data buffer), control information, and possibly CSI. The transmitted signal can comprise a pulse-shaped signal and may optionally include a pulse-shape message to indicate which pulse shape is being used, such as when the wireless device selects the pulse shape.

FIG. 6B is a block diagram that depicts a processor and processing operations in accordance with some aspects of the disclosure. An uplink control-channel processor, such as PUCCH processor 611, receives scheduling requests from UEs. Optionally, the PUCCH processor 611 receives pulse-shaping requests from the UEs. The requests are processed by a downlink control-channel processor, such as PDCCH processor 612, which transmits scheduling grants to the UEs. Availability of PRBs, BSRs, CSI, RSS, spectral efficiency criteria, and/or power efficiency criteria may be used by the PDCCH processor 612 to provision uplink grants and (optionally) pulse-shape grants. The PDCCH processor 612 may assign a number of PRBs to the UE based on the amount of data indicated in the UE's BSR, pulse shape (requested by the UE or selected by the BTS), and possibly other factors, such as CSI, modulation, and coding. In some aspects, PDCCH processor 612 provisions a pulse-shape grant in the absence of a pulse-shaping request. In some aspects, the UE selects its pulse shape and may inform the BTS of its selection via an uplink control channel or an uplink traffic channel. In some aspects, PUSCH processor 613 can infer which pulse shape a UE employs, such as by using blind or semi-blind signal analysis, or possibly based on BSRs and the amount of excess resources in the corresponding uplink grant(s).

In some aspects, subsets of the full DFT-s-OFDM code space in each DFT-s-OFDM symbol can be provisioned by a BTS to different devices (e.g., layers). This can provide for code division multiple access within the DFT-s-OFDM symbol via the DFT-s-OFDM code space. For example, in FIG. 11, a first code space comprising codes 1101-1104 can be assigned to a first group of layers (e.g., UEs), and at least a second code space comprising codes 1105-1108 can be assigned to a second group of layers. The first and at least second code spaces employ the same PRBs (e.g., the same LFDMA or IFDMA subcarriers), and each has the full spreading and frequency-diversity benefit of the DFT-s-OFDM spreading across all the PRBs used in the DFT-s-OFDM symbol. If the layers employ NOMA (e.g., SCMA, RSMA, PDMA, pDMA, LDS, etc.), the partitioning of the full DFT-s-OFDM code space into multiple (orthogonal) code-space subsets (i.e., OMA code-space subsets) can substantially reduce receiver processing complexity. Partitioning the full DFT-s-OFDM code space into code-space subsets can constitute OMA partitioning, wherein the subsets are orthogonal to each other, and NOMA can be performed for the layers in each subset. In one aspect, the BTS groups layers with similar channel conditions into the same partition. In another aspect, the BTS selects layers with different channel conditions to group into each partition. Since the code-space subsets span all the subcarriers of the DFT-s-OFDM symbol, this enables each layer to exploit frequency diversity to mitigate the effects of flat fading and narrowband interference. In some aspects, the layers are uniformly distributed among OMA subsets, and each subset has a reduced number of interfering (i.e., colliding) layers, or at least the upper bound on collisions is reduced, which dramatically reduces the required codebook size C. In the factor graph representation of an SCMA system, this reduces both the number of layer nodes and the number of resource nodes, which can reduce the degree $d_f$ of the resource nodes. By using MPA, the receiver can perform a MAP detection, wherein the complexity per resource node is $O(d_f C^{d_f})$. The detection needs to be performed in each code-space subset, so the total complexity is approximately the average complexity of performing detection in one subset multiplied by the number of subsets. But since the complexity increases exponentially with respect to C and $d_f$, reducing C and $d_f$ by partitioning the code space has the net effect of dramatically reducing receiver complexity.

Some aspects provide for scheduling particular ones of the code spaces (e.g., DFT-s-OFDM codes) to particular UEs. In the downlink, this can provide OFDMA signals with low PAPR, which can be useful for D2D and ProSe. For uplink grants, this can reduce latency. An elementary delay component is the transmit time interval (TTI), defined as the minimum data block length, which is involved in each transmission of grant, data, and retransmission due to errors detected in higher layer protocols. In 5G, for example, time is divided into slots, which are further sub-divided into mini-slots. URLLC resource allocations can occur at mini-slot boundaries (possibly pre-emptively overlapping cMBB communications) in order to reduce latency. UEs may employ a subset of the available DFT-s-OFDM codes in a given OFDM symbol for uplink transmissions, which can enable multiple UEs to share the same PRBs few or no collisions. Also, higher system reliability for URLLC may be achieved by allocating more frequency-domain resources to an uplink transmission instead of boosting power on narrowband resources.

To shorten latency, the UE can transmit uplink traffic in a contention-based grant-free manner without waiting for a grant or resource allocation message. In contention-based access, two or more UEs may attempt to transmit simultaneously over a shared channel, and collisions may occur. Code-slotted ALOHA may comprise dividing each OFDM symbol into multiple DFT-s-OFDM code spaces, each comprising a subset of the DFT-s-OFDM codes, and enabling the UEs to contend for these code spaces.

Figures 7A, 7B:
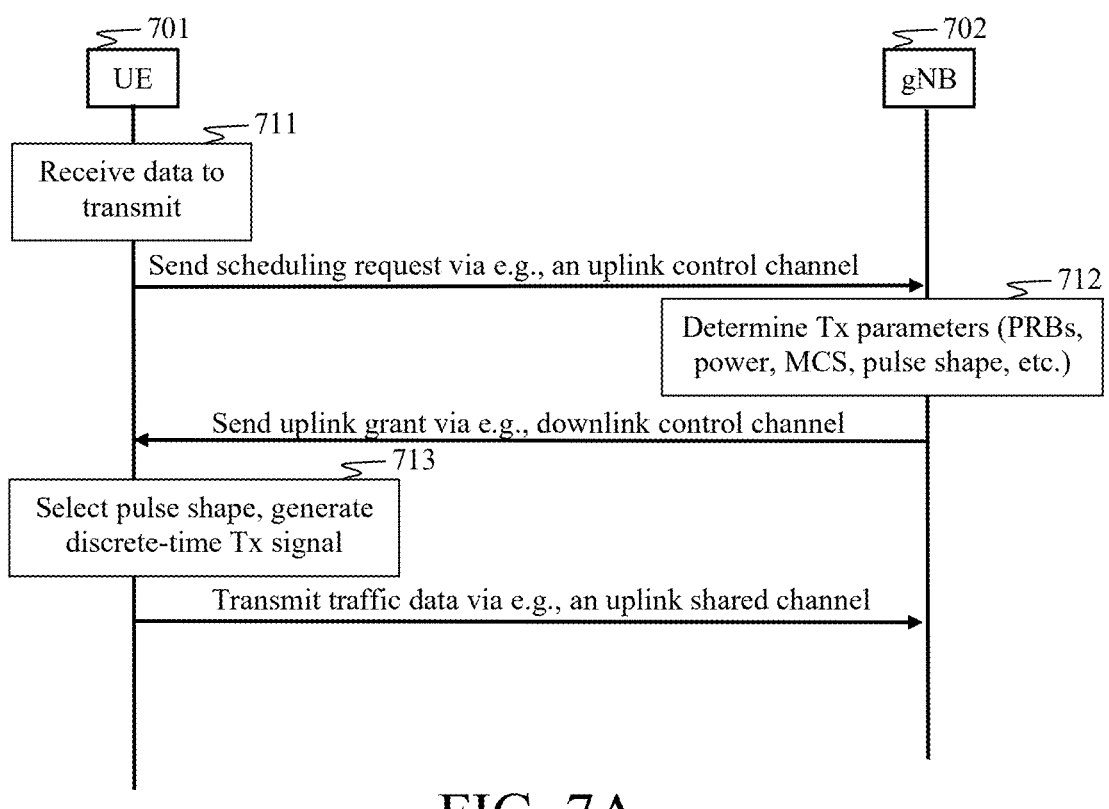

FIG. 7A is a message sequence chart for a BTS (e.g., a gNB 702) and a wireless device (e.g., UE 701). Additional features not depicted in the charts in FIGS. 7A-7D may be employed. A UE buffer receives data to transmit 711, which prompts the UE to send a scheduling request via an uplink control channel. This may be preceded by the UE acquiring primary and secondary synchronization signals, and a broadcast channel. The UE may transmit a random access preamble, and the BTS may respond with a random access response message, which may include an uplink grant for certain control messages. The UE may employ a UL-SCH allocation to send an RRC request message. The BTS may request a UE capabilities report from the UE, which the UE then transmits to the BTS. The gNB may employ a downlink control channel to signal downlink resource block allocations to the UE. In some aspects, a PDSCH (and possibly other downlink channels, e.g., PDCCH) resource scheduling comprises information about channel coding, modulation, and resource block assignments (e.g., Modulation and Coding Scheme (MCS) information). In some aspects, this information can include pulse-shaping information, such as pulse type and/or roll-off factor.

In some aspects, a relay receives downlink and/or uplink transmissions, and reformats the physical-layer parameters of the retransmitted signal. To reduce PAPR and improve the relay's power efficiency, the relay may apply pulse shaping to the retransmitted signal. The relay may communicate the corresponding pulse-shaping information to the destination node using any of the channels described herein.

The BTS may determine uplink transmission parameters 712 for the UE, possibly based on information the BTS receives from UEs, and/or the BTS's measurements of the wireless network, such as network loads, geographical distributions of UEs, CSI, MIMO performance, available PRBs, or RSS. The BTS assigns uplink MCS and transmits an uplink grant to the UEs via a downlink control channel. This transmission may include a pulse-shape grant and/or a code space grant. The UE selects a pulse shape (from a resource grant or determined by the UE) and grant parameters to generate a transmission signal 713, which can include traffic data, and transmits the signal in an uplink shared channel (e.g., PUSCH).

FIG. 7B is a message sequence chart between a network node (e.g., a gNB 702) and a UE 701. Additional features not depicted in the chart may be employed. A UE buffer receives data to transmit 721, which prompts the UE to select a pulse shape and generate a transmission signal 722 therefrom. The transmission signal may be a NOMA signal. The transmission signal is transmitted via an uplink shared channel to the BTS, which may perform joint detection of received NOMA (e.g., SCMA) layers 725, and may perform an HARQ process 727 by utilizing a physical HARQ indicator channel (PHICH) to carry HARQ feedback (e.g., acknowledgment (ACK) or negative acknowledgment (NACK)) transmissions. Aspects disclosed herein can be employed in eMMB solutions wherein PRBs are granted, and grant-free implementations (such as URLLC, mMTC, eMTC applications, and others).

Figure 7C:
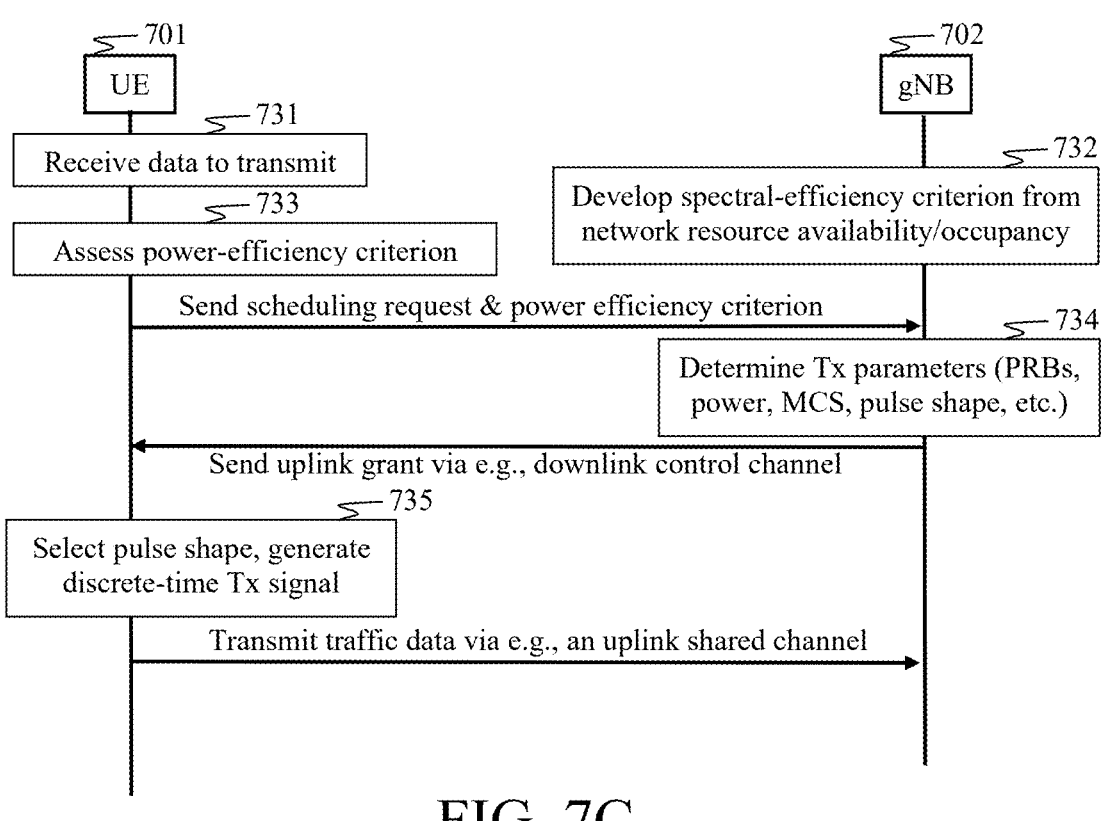

FIG. 7C is a message sequence chart between a network node (e.g., a gNB 702) and a UE 701. Additional features not depicted in the chart may be employed. A UE buffer receives data to transmit 731, and the UE may optionally assess its power-efficiency criterion 733 before sending a scheduling request, which may contain power-efficiency information. The BTS may develop a spectral-efficiency criterion 732 based on network resource availability or occupancy. Upon receiving the scheduling request, the BTS determines parameters 734 for provisioning an uplink grant for the UE. The uplink grant may include a pulse shape to be used by the UE. The BTS transmits the uplink grant via a downlink control channel, and the UE selects the pulse shape, along with other MCI, to generate its uplink transmission signal. Some aspects provide for an Adaptive Transmission Bandwidth (ATB), wherein a MAC scheduler might adapt PRBs, MCS, pulse shaping, and/or code space due to a rapid change in the available transmission bandwidth.

Figure 7D:
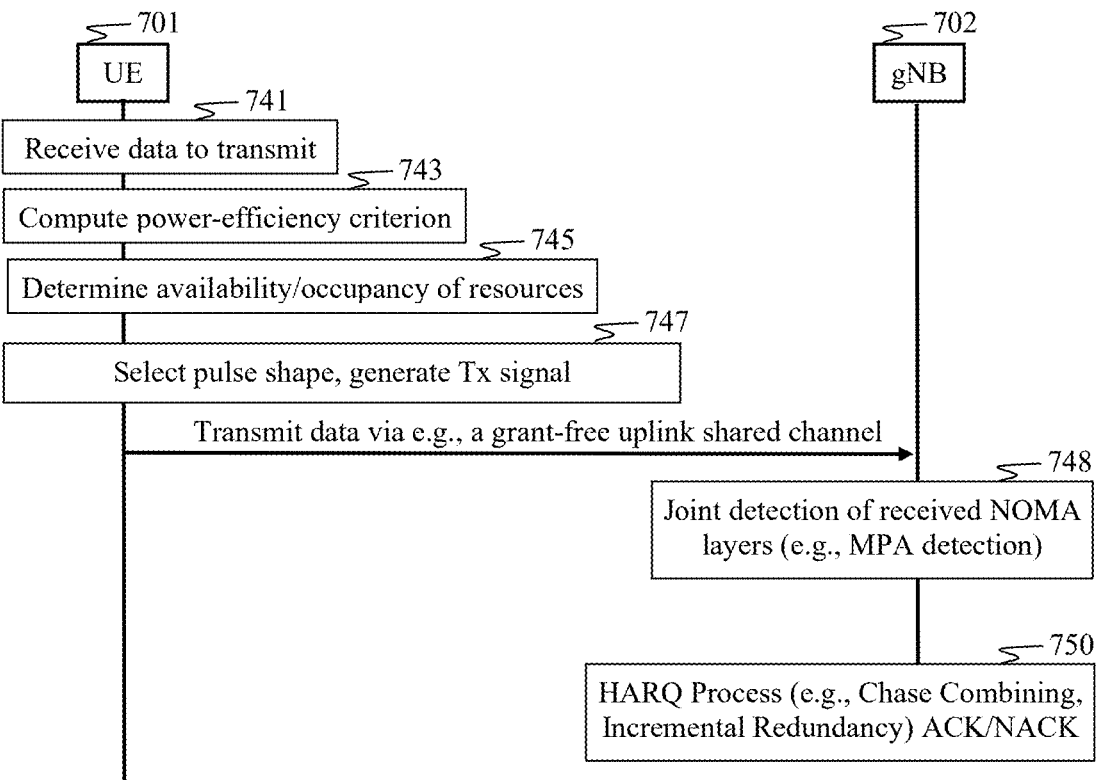

FIG. 7D is a message sequence chart between a network node (e.g., a gNB 702) and a UE 701. Additional features not depicted in the chart may be employed. A UE buffer receives data to transmit 741, and the UE may optionally assess its power-efficiency criterion 743 and/or determine the wireless network's spectral-efficiency criterion, such as by determining availability or occupancy of network resources 745. The UE selects a pulse shape to use in the uplink based on the power-efficiency and/or spectral-efficiency criteria 747, and transmits its uplink signal, possibly in a grant-free manner. The BTS may perform joint detection of received NOMA layers 748, such as via MPA, followed by an HARQ process 750.

Aspects disclosed herein can be adapted for 5G Device to Device Relay Communication (5G D2DRC) and may include Amplify-and-Forward (AF) and/or Decode-and-Forward (DF). For example, a relay station may be employed in an uplink for communicating between the UE and gNB. Aspects disclosed herein can be adapted for other peer-to-peer networks.

FIG. 8 is a block or flow diagram that depicts aspects of the disclosure. Each depicted element can be a part or step of a method or apparatus. Each element may be a means for performing its corresponding step, such as an electronic circuit, a computer processor programmed to perform the step, at least a portion of a non-transitory computer-readable memory comprising software instructions stored therein and executable by a processor to perform the step, or a software program or source code segment executable by a processor to perform the step. A means for performing a step may comprise a Cloud, a Fog, virtualized machines, and/or software-defined networks.

In one aspect, the instructions can comprise a software interface such as to provide for access to resources (e.g., functions, variables, etc.) inside a program or source code segment. Interfaces between software components can provide constants, data types, types of procedures, exception specifications, and/or method signatures. Sometimes public variables are defined as part of an interface. A software interface may provide access to computer resources, such as memory, CPU, storage, etc.). A software module can comprise an interface and an implementation, wherein the implementation can contain code configured to perform procedures and methods described in the interface, as well as comprising private variable, procedures, and/or other structures and/or capabilities.

A means for encoding 801 can provide a bit-to-symbol mapping of a binary input to a multi-level sequence of complex numbers in at least one of several possible modulation formats. The means for encoding 801 might comprise a NOMA (e.g., SCMA, RSMA, PDMA, pDMA, LDS, analog fountain code encoder, spreader, and/or a modulator (e.g., a QAM modulator); and may perform data whitening using a means for whitening or sphering transformation. The means for encoding may comprise one or more codebooks to encode data bits for one or more layers.

Encoded data, possibly along with sparsity information for each layer or symbol, may be processed in a means for code-space mapping 811, which can map each layer's encoded data to one of multiple sparse DFT-s-OFDM code spaces in a DFT-s-OFDM symbol. In one aspect, each layer is mapped to a different sparse DFT-s-OFDM code space in the DFT-s-OFDM symbol. Each layer may have a corresponding unique code space, and the encoded data may be modulated thereon by a single transmitter, or by multiple transmitters (e.g., one transmitter for each layer). In another aspect, each encoded data value is provided with (by means 811) a corresponding unique code space, and each layer employs a unique identification symbol that it modulates (e.g., means 811 may include a means for modulating) onto any code space it transmits. In this aspect, data whitening can help reduce the likelihood that a large number of layers concurrently transmit in the same code space. In another aspect, means 811 maps the encoded data to a sparse code space in some other orthogonal matrix, or in a set of covering codes, and then the coded symbols are spread by a means for DFT-spreading 802. The means 811 may include a data buffer or queue to arrange symbols in an order, insert zeros, and produce data blocks or other data structures to be inserted into means 802. The location of each symbol in the data block maps the symbol to a particular code in the DFT-s-OFDM code space. In any of the aspects, the means 811 may map symbols to a shared (e.g., NOMA) code space inside an OMA partition in the DFT-s-OFDM code space.

The means for code-space mapping 811 and/or the means for DFT spreading 802 may receive control inputs from a means for spreading configuration 812, which is coupled to a means for scheduling means 813. The means 813 may send pulse-shaping grants, uplink grants, codebooks, and the like to means 812, which can adapt mapping 811 and/or DFT spreading 802 accordingly.

Symbol blocks, each containing $M_s$ symbols, are input to means 802. Serial-to-parallel conversion may be performed. An $M_s$-point DFT spreading produces DFT-spread input symbols, which may optionally be shaped by a pulse-shaping filter means 803. Means 811 is not necessary, but is optional, in a device that includes means for pulse shaping 803. The pulse shape may be selected based on control messages from the means for scheduling 813. A means for symbol-to-subcarrier mapping 804 maps the spread (optionally, pulse-shaped) symbols to a means for OFDM modulation 805, such as an IFFT, to produce a discrete-time signal. A means for appending a cyclic prefix 806 and/or additional baseband processing 807 may be provided.

FIG. 9A is a flow diagram that depicts pulse-shape provisioning performed by a UE. A UE sends a pulse shape request message 901 on an uplink channel, possibly along with an uplink grant request, to a gNB. The UE receives a pulse-shaping grant 902 on a downlink channel from the gNB, possibly along with an uplink grant. The UE employs pulse shaping parameter(s) indicated in the pulse-shaping grant for pulse shaping a signal to be transmitted in an uplink channel 903.

FIG. 9B is a flow diagram that depicts pulse-shape provisioning performed by a gNB. A gNB receives a pulse-shape request 911 in an uplink channel from a UE. The gNB is responsive to the pulse-shape request and possibly any of various UE and/or RAN system information for sending a pulse-shape grant 912 in a downlink channel to the UE. The gNB can use a pulse-shaping filter selected or configured to match the pulse shape in the grant. The gNB uses the selected or configured pulse-shaping filter to process uplink signals received from the UE 913.

FIG. 9C is a flow diagram that depicts pulse-shape provisioning performed by a UE. A UE sends a UE status message 921 on an uplink channel, possibly along with an uplink grant request, to a gNB. The UE status message may include the amount of buffered data to send, power information, and/or other information that indicates operating parameters of the UE and/or characteristics of the UEs environment. The UE receives a pulse-shaping grant 922 on a downlink channel from the gNB, possibly along with an uplink grant. The UE employs pulse shaping parameter(s) indicated in the pulse-shaping grant for pulse shaping a signal to be transmitted in an uplink channel 923.

FIG. 9D is a flow diagram that depicts pulse-shape provisioning performed by a gNB. A gNB receives a UE status message 931 in an uplink channel from a UE. The gNB is responsive to the UE status and possibly any of various UE and/or RAN system information for determining a pulse-shape grant. The eNB sends the pulse-shape grant 932 in a downlink channel to the UE. The gNB can use a pulse-shaping filter selected or configured to match the pulse shape in the grant. The gNB uses the selected or configured pulse-shaping filter to process uplink signals received from the UE 933.

FIG. 9E is a flow diagram that depicts pulse-shape provisioning performed by a UE. A UE sends an uplink request message 941 on an uplink channel to a gNB. The UE receives an uplink grant 942 on a downlink channel from the gNB. The UE can send pulse-shaping information 943 in an uplink channel to the gNB, possibly along with signals that the UE pulse-shaped with respect to pulse-shaping parameters indicated in the pulse-shaping information.

FIG. 9F is a flow diagram that depicts pulse-shape provisioning performed by a gNB, which receives an uplink request 951 in an uplink channel from a UE. The gNB is responsive to the uplink request and possibly any of various UE and/or RAN system information for sending an uplink grant 952 in a downlink channel to the UE. The gNB receives pulse-shaping information from a UE and can select or configure a pulse-shaping filter to match the pulse shape employed by the UE. The gNB uses the selected or configured pulse-shaping filter to process uplink signals received from the UE 953.

FIG. 10A illustrates various apparatus, method, and computer software aspects of a wireless device that communicates in a wireless network. A spreader 1001 is configured to spread at least one data signal with at least one spreading code to produce a spread data signal. An OFDM modulator 1002 modulates the spread data signal onto an OFDM signal to generate a discrete-time spread-OFDM signal. The spreader 1001 can comprise or be communicatively coupled to a spreading-code pulse-shaping selector, such as a spreading-code roll-off factor selector 1001, which may employ a function of at least one of a power-efficiency criterion for the wireless device or a spectral efficiency criterion for the wireless network to select a spreading code roll-off factor that provides the discrete-time spread-OFDM signal with a predetermined PAPR.

Criterion, as used herein, is a factor, principle or standard by which something may be evaluated, judged, assessed, or decided. Criterion can be described as a basis, which is something on which something else is established or based.

A power-efficiency criterion can include at least one of battery life remaining, battery charge, battery discharge rate, battery capacity, current consumption (draw), power usage, linearity of amplifier, battery service life, peak output power, amplifier efficiency, power headroom, power of entire transmitter chain, power of the entire device, how the efficiency varies with output power, power backoff, cost to replace the wireless device or the wireless device's battery, the wireless device's access to line power, whether the device is recharging, and/or energy harvester status (e.g., amount of ambient energy available to be harvested, amount of energy being harvested by an energy harvesting transducer or collector, such as a photovoltaic, thermoelectric, piezoelectric, inductive, or electromagnetic transducer; and/or amount of energy stored, such as in a capacitor, rechargeable battery, or solid state battery). The power-efficiency criterion might further include link margin or link budget, which may be computed using CSI.

A spectral efficiency criterion can include resource occupancy or resource availability in the wireless network. The spectral-efficiency criterion might further consider the type of data service being employed, such as for establishing a minimum latency requirement, a minimum data rate requirement, a minimum QoS requirement, or the like.

Occupancy, as used herein, can be the proportion of a resource occupied, reserved, or in use. It can be the number of things that are held, possessed, taken, filled, or resided in or on, in relation to the total number available. Occupancy can be the fact or condition of being occupied. Occupancy can be the proportion of uplink and/or downlink resources scheduled, reserved, allocated, or assigned for use by UEs. Occupancy can be the proportion of resources actively in use. Occupancy can be an occupancy prediction of the communication resource for some later time, such as may be computed from data buffer size, number of requests for services, number of requests for retransmissions, current resource use, and/or historical data.

Availability, as used herein, is the state of being unoccupied. Availability can be an amount, proportion, or number of something that can be acquired, obtained, or used; or an amount of something that is suitable, accessible, obtainable, or ready for use. The availability of a resource may equal the total amount of the resource minus the occupancy of the resource. Availability can be the amount, proportion, or number of uplink and/or downlink resources not currently scheduled, reserved, allocated, or assigned for use by UEs. Availability can be the amount, proportion, or number of the resources not currently being used. Availability can be an availability prediction of the communication resource for some later time, such as may be computed from data buffer size, number of requests for services, number of requests for retransmissions, current resource use, and/or historical data.

Resource, as used herein, can comprise a set of spectral resources (such as PRBs, OFDM subcarriers), code spaces, power-domain resources, and/or physical resource layers, in the sense of spatial subchannels, polarization channels, or beams. A resource may be an overloaded resource, such as may be employed in NOMA.

The pulse-shape selection 1011 can employ an algorithm that selects a higher code roll-off factor when the available PRBs are plentiful, and selects a lower code roll-off factor when the available PRBs are scarce. Plentiful and scarce may be defined by occupancy threshold values, which may be computed as a function of variance that relates to data buffer size, and may possibly be scaled by UE type, the device's power-efficiency criterion, SNR, CSI, data service type, and/or other factors.

The spreading codes can comprise selectable roll-off factors to provide different levels of PAPR-reduction. These roll-off factors might be selected to improve total efficiency, as a measure of spectral efficiency plus power efficiency. The total efficiency can comprise local measures of efficiency (e.g., per transmitter or clusters of transmitters) and/or global measures of efficiency (e.g., per BTS, per sector, per cell, in a subnetwork, or in the entire network).

Spectral efficiency can be weighted according to the availability of spectrum resources (e.g., PRBs) such that the contribution of spectral efficiency to the total efficiency is small when spectrum resources are plentiful, and high when such resources are scarce. Power efficiency can be weighted according to operating conditions relative to each transmitter (such as the transmitter's battery life, the amount of data in the buffer or queue, CSI, QOS, MCI, the SNR of transmitted signals at the receiver, etc.) and/or system (e.g., overall network) performance metrics, such as total power usage, interference (e.g., inter-cell and intra-cell interference), coverage area, etc. Power efficiency might be weighted higher when spectrum resources are plentiful and lower when spectrum resources are scarce. Power efficiency might be weighted higher for individual devices that have low battery power, higher longevity requirements, and/or are operating in a range of SNR in which improved power efficiency has a lower bandwidth efficiency cost.

In one aspect, selection of a spreading code roll-off factor $\beta$ based on total efficiency can be implemented using the following computation:

$$\beta = \sigma(x_1) \cdot y(x_2)$$

where gating function $\sigma(x_1) = 0$ for small values of $x_1$, 1 for large values of $x_1$, and $0 < \sigma(x_1) < 1$ for $x_1$ in between the small and large values; gating function $\gamma(x_2) = 1$ for small values of $x_2$, $\gamma(x_2) = 0$ for large values of $x_2$, and $0 < \gamma(x_2) < 1$ for $x_2$ in between the small and large values; $x_1$ is some measured spectrum parameter (such as number of unscheduled PRBs);

and $x_2$ is some measured power parameter (such as UE battery life). When the roll-off $\beta$ is near 0, higher spectral efficiency is achieved. When the roll-off $\beta$ is near 1, higher power efficiency is achieved.

In one example, a UE determines its remaining battery life and listens to scheduling information in a downlink control channel to determine the number of unscheduled PRBs, and then selects a $\beta$ value using the above computation. Then the UE might use the $\beta$ value to spread its data and transmit the spread data signal (possibly in a grant-free access scheme), or it might send the $\beta$ value along with a request for uplink resources. The BTS might respond to the $\beta$ value by granting the $\beta$ value or an alternative $\beta$ value to the UE. The UE might determine other power parameters (e.g., metrics). For example, the UE might measure the downlink channel from the BTS and infer therefrom the received SNR of its transmission at the BTS, which can be used to compute $x_2$. The UE might determine spectrum use by listening to uplink transmissions from other UEs and/or scheduling messages in the network and use this information to compute $x_1$.

In one example, the UE transmits at least some power information and/or spectrum information to the BTS, which can select a $\beta$ value therefrom and transmit the $\beta$ value along with an uplink grant to the UE. In some aspects, UEs may negotiate with each other and/or with one or more BTSs to select their $\beta$ values and/or spectrum resources.

In one aspect, spreading code roll-off factor $\beta$ based on total efficiency can be computed as:

$$\beta = \sigma(\text{network parameter(s)}) \cdot \gamma(\text{UE parameter(s)})$$

where network parameters comprise at least one spectrum parameter that characterizes spectrum use in a sector, cell, subnetwork, or an entire network, and UE parameters comprise at least one power parameter aggregated or averaged across multiple UEs. In one example, a BTS might measure spectrum and power parameters averaged or aggregated across multiple UEs, determine $\beta$ values therefrom, and schedule the $\beta$ values to the UEs along with uplink resource grants. The same $\beta$ value might be scheduled to all of the UEs. In one aspect, the above computation can be employed to compute $\beta$ values for different groups of UEs, wherein the UEs are grouped with respect to spectrum parameter, power parameter, or a combination thereof.

As the $\beta$ value increases, the signal occupies more bandwidth and may require less power for transmission, resulting in better power efficiency. The PAPR diminishes due to the reduced sidelobe amplitudes of the discrete-time signal, which further improves power efficiency via improved power amplifier efficiency. The reduction in sidelobes may reduce the error rate of the received signal, which usually improves spectral efficiency. Furthermore, since the signal is spread in the frequency domain, increasing the signal's bandwidth occupancy can improve the transmission performance (e.g., increased frequency diversity can mitigate multipath fading), which can enable gains in either or both power efficiency and spectral efficiency. Since spectral and power efficiency metrics are degraded by channel effects, the computation of $\beta$ can include a function of CSI.

Shannon's formula is:

$$C = B \text{Log}_2\left(1 + S_P/N_P\right) \text{ bits/sec}$$

where C is capacity (bits/sec), B is bandwidth (Hz), $S_P/N_P$ is the ratio of signal power to noise power (SNR); and the channel noise power is $N_P = N_0 B$, where $N_0$ is the power spectral density of the channel AWGN. The signal and noise power levels are expected to be measured at the receiver end of the channel. Thus, the power level is a function of transmitted power and the attenuation of the signal over the transmission channel. The definition of channel capacity indicates that the channel bandwidth B can be traded for SNR (e.g., signal power $S_P$), and vice versa. Depending on whether B or $S_P$ is more expendable, aspects can increase one and reduce the other, while maintaining the same channel capacity.

The reduced signal power $S_P \rightarrow (1-\alpha)S_P$ that results from increasing bandwidth $B \rightarrow (1+\beta)B$ can be expressed as:

$$B\log_2\left(1 + \frac{S_P}{N_0 B}\right) = B(1 + \beta)\log_2\left(1 + \frac{(1-\alpha)S_P}{N_0 B(1 + \beta)}\right)$$

which illustrates how a depends on the signal power $S_P$. At high SNR, the reduction in signal power $S_P$ enabled by increasing the bandwidth B is greater than at low SNR. However, if the SNR is low due to a deep fade, increasing the bandwidth B can enable a dramatic decrease in signal power $S_P$.

In some aspects in which MIMO is employed, the PRBs can comprise layer information. Availability of PRBs can comprise layer (e.g., subspace) availability. The layer availability may be scaled by eigenvalues of corresponding subspace channels. By way of example, considering the uplink in one cell of a Massive-MIMO system with K single-antenna UEs and M antennas at the BTS, the received M-dimensional signal is:

$$y = \sum_{i=1}^{K} h_i x_i + n$$

where $x_i$ is the unit-power information signal from user i, $h_i \in \mathbb{C}^M$ is the fading channel of this user, and $n \in \mathbb{C}^M$ is unit-power additive Gaussian noise. In practice, the BTS has imperfect channel estimates, $\hat{h}_i \in \mathbb{C}^M$, which it uses to select a receive combining vector $v_k \in \mathbb{C}^M$ for user k. The received signal y is multiplied with $v_k$ to provide an estimate of $x_k$:

$$v_k^H y = v_k^H h_k x_k + \sum_{i=1,i\neq k}^{K} v_k^H h_k x_k + v_k^H w$$

Where the first term is the desired signal, the second term is interference, and the third term is noise. While it is common in the literature to construct SNR using the powers of these signal, interference, and noise terms, this can cause significant errors when CSI is not perfectly known. Instead, it can be more useful to employ an effective SNR.

In Massive MIMO, it can be useful to determine a lower bound on the ergodic capacity. In one example, the lower bound on uplink capacity can be provided when the channels are Gaussian distributed, and the values $\hat{h}_1, \ldots, \hat{h}_K$ are MMSE estimates with corresponding covariance matrices $E_1, \ldots, E_K$. The lower bound ergodic capacity of user k can be computed from:

$$R_k^{(1)} = \mathbb{E}\left\{\log_2\left(1 + \frac{|v_k^H h_k|^2}{\sum_{i=1,i\neq k}^{K} |v_k^H h_i|^2 + \sum_{i=1}^{K} v_k^H C_i v_k + \|v_k\|^2}\right)\right\}$$

The quantity operated on by the log includes the effective SNR.

Alternatively, the following lower bound can be computed:

$$R_k^{(2)} = \log_2\left(1 + \frac{|\mathbb{E}\{v_k^H h_k\}|^2}{\sum_{i=1,i\neq k}^{K} \mathbb{E}\{|v_k^H h_i|^2\} - |\mathbb{E}\{v_k^H h_k\}|^2 + \mathbb{E}\{\|v_k\|^2\}}\right)$$

which can be used for any channel fading distribution. $R_k^{(2)}$ approaches $R_k^{(1)}$ when there is substantial channel hardening. Since all the terms in $R_k^{(2)}$ are deterministic, the receiver can compute it using its available information. The expectations in the numerator and denominator can sometimes be computed in closed form; for example, when using maximum-ratio and zero-forcing combining with i.i.d. Rayleigh fading channels or maximum-ratio combining with correlated Rayleigh fading.

The bandwidth efficiency of M-QAM modulation can be defined as the ratio of maximum average information rate to normalized bandwidth. Each M-QAM level attains its highest power efficiency in a specific range of SNR. In some aspects, the power efficiency takes into account the effect of PAPR due to the M-QAM constellation and the roll-off factor of the spreading. Thus, adaptive transmission may enhance resource efficiencies based on SNR regions by adapting the modulation level and spreading roll-off as a function of SNR.

In some aspects, the β value can be computed to improve a utility versus cost relationship. For example, utility might comprise a function of the number of devices served and might include the total data rate (or an average or mean data rate per user). Utility might be linearly proportional to the number of UEs being served, and logarithmically proportional to the average data rate per UE, since serving more UEs may be more important than maximizing the overall data rate. The utility might be related to a monetary value, such as a revenue per UE or revenue per data service. Improving utility versus cost might comprise selecting particular ones of the UEs to serve, wherein each UE might have a first weight corresponding to its utility value and a second weight corresponding to its cost value, and the selection is a multivariate problem wherein the UEs are served in a manner that improves or optimizes the utility versus cost. The cost might comprise a cost of power consumption. The cost might comprise a measure of power efficiency, which can be a measure of power per bit rate or power per user. The cost might include a function of the cost to service or replace a UE when its battery charge gets low. Thus, the cost associated with each UE may comprise a weight that is a function of one or more parameters, such as UE type, battery life remaining, CSI, SNR, QOS, amount of queued or buffered data, type of data service, etc.

An optional DFT-s-OFDM code-space mapper 1012 can provide code space information to the spreader 1001 to select particular ones of the DFT-s-OFDM codes that modulate the data. The full DFT-s-OFDM code space of a DFT-s-OFDM symbol might be partitioned into multiple orthogonal code-space subsets, thus providing for orthogonal code division multiplexing or orthogonal code division multiple access in the DFT-s-OFDM code space between different layers. In some aspects, NOMA is provisioned within each orthogonal (OMA) code-space subset. Each layer in a subset may employ its own sparse code space, and the code spaces of multiple layers might overlap, such as to allow overloading in the code-space subset, which effects NOMA. For example, a scheduler 1007 might assign a layer corresponding to the wireless device to an OMA code-space subset, and an indicator of this subset can be sent to mapper 1012, which might provision a sparse code space from SCMA mapper 1005 inside the subset to produce the code space that is sent to the spreader 1001. In some aspects, the wireless device might multiplex multiple layers into the same code-space subset (possibly overloading the subset's code space to implement NOMA) or across multiple subsets.

FIG. 10B depicts a possible receiver configuration and reception method. A received OFDM signal is demodulated 1051 and despread 1052. If pulse shaping was provided to the transmitted OFDM signal, a corresponding matched filter with selected roll-off is applied to the demodulated signal before despreading 1052. If the DFT-s-OFDM code space of the DFT-s-OFDM symbol was partitioned into multiple orthogonal code-space subsets, code-space demultiplexer 1062 might receive subset information for each layer from a scheduler 1067 and then configure the despreader 1052 to despread those subsets. Each despread subset is an OMA partition, whose resources (e.g., power domain or code domain) might be overloaded. If NOMA is employed within each partition, a NOMA receiver 1055 might be provided to perform NOMA reception within each OMA partition.

FIG. 11 represents code spaces 1101-1116 in a discrete-time signal for M=16 and a Rect function pulse shape in the frequency domain. Each code space 1101-1116 is depicted by the real part of the discrete-time signal output of the IDFT 805. Code space 1101, for example, has a corresponding sinc waveform in the time domain, onto which a first data symbol $b_1$ may be effectively modulated by the DFT spreader 802. In practice, the real (or in-phase "I") part of symbol $b_1$ can be effectively (or actually) modulated onto the real part of the discrete-time signal, and the imaginary (or quadrature-phase "Q") part of symbol $b_1$ can be effectively (or actually) modulated onto the imaginary or Q part of the discrete-time signal.

In FIG. 11, code space 1102 may be a cyclic-shifted version of the sine waveform corresponding to code space 1101, onto which a second data symbol $b_2$ may be effectively modulated by the DFT spreader 802. In FIG. 11, up to 16 data symbols or layers can be modulated onto the 16 orthogonal code spaces 1101-1116, each possibly related to a kernel discrete-time waveform with respect to a cyclic shift index, 0, 1, . . . , 15.

In some aspects, the pulse bandwidth (e.g., number of subcarriers) is fixed, and different pulse-shape configurations provide for different pulse widths. Thus, pulse shaping may reduce the number of code spaces in an OFDM symbol interval. The spreading configuration 811 may interface with at least one of the scheduling module 813 and the filter 803 to determine the number of code spaces in an OFDM symbol interval based on a given pulse shape, and then adapt the spreading codes in the spreader 802 to provide for a predetermined set of orthogonal or quasi-orthogonal code spaces.

In some aspects, the filter 803 selects and/or computes filter weights to be applied to at least some of the M symbol values output from the Spread-DFT 802. In some aspects, the filter weights are computed to synthesize a predetermined pulse shape in the time-domain. Thus, the filter 803 may employ filter weights corresponding to a DFT of a desired time-domain pulse shape. Such discrete-time pulse shapes can include raised cosine, modified raised cosine, root-raised cosine, modified root-raised cosine, Gaussian, Manchester, Sine, Sinc power, improved Sinc power, binary offset carrier pulse shape, generalized raised cosine, K-exponential, parametric linear pulse, linear combinations of pulses (e.g., Nyquist pulses), as well as others. The aforementioned pulse shapes may be implemented by the filter 803 in the frequency domain. The filter weight vector can be expressed as a vector of complex values:

$$ w = [w_0, w_1, \ldots, w_{N-1}]^T \in \mathbb{C}^{N \times 1} $$

which modulates the OFDM tones. In some aspects, the first and/or last element may be zero, thus providing for either M−1 or M−2 subcarriers. In one aspect, subcarrier mapping 804 provides for a predetermined spectral mask, and then weights are selected in 803 to provide at least a given PAPR-reduction. This may comprise adapting the code space in 802.

In some aspects, the relationship between the weight vector and the PAPR of the corresponding discrete-time signal can be expressed by an aperiodic auto-correlation function of the weight vector. Sidelobes of the aperiodic correlation, determines the PAPR of the corresponding discrete-time signal, and thus can be exploited for computing weights that provide for reduced PAPR.

In one aspect, the frequency-domain filter weights for a sinc power pulse are expressed as:

$$ W_{ISP}(f) = e^{-a(fT)^2} \, \text{sinc}^{m'}(fT) $$

where f is frequency, T is an OFDM symbol duration, a is a design parameter to adjust the amplitude, and m' is the degree of the sinc function.

In another aspect, the frequency-domain filter weights for a modified raised cosine pulse are expressed as:

$$ w_{mrc}(f) = T, \text{ for } 0 \le |f| \le \frac{1 - \beta}{2T} $$

$$ w_{mrc}(f) = \frac{T}{2}\left(1 + \cos\left[\frac{\pi T}{\beta}\left(|f| - \frac{1 - \beta}{2T}\right)\right]\right), \text{ for } \frac{1 - \beta}{2T} \le |f| \le \frac{1 + \beta}{2T} $$

$$ w_{mrc}(f) = 0, \text{ for } |f| > \frac{1 + \beta}{2T} $$

where $\beta$ is the roll-off factor, which can provide the filter bandwidth B=(1+α)/2T. Other parameters (not shown) may be incorporated into the raised cosine filter. In some aspects, a multiplicative factor may be used to scale the period of the raised cosine function.

Aspects disclosed herein can be adapted to any of various types of chirped spread-spectrum modulation to effect a multi-"carrier", including Long Range (LoRa), Low-Power Wide Area Networks (LPWAN), and LoRaWAN. Such aspects may employ any of the LoRa MAC options, such as Class A (Bi-directional end-devices), Class B (Bi-directional end-devices with scheduled receive slots), and Class C (Bi-directional end-devices with maximal receive slots).

FIG. 12 is a block diagram that depicts functional aspects of receiver configurations. Baseband processing 1301 can perform frequency down-conversion, ADC, filtering, synchronization, and/or other digital processing of a received radio signal. An optional cyclic prefix remover 1302 removes a cyclic prefix, a postfix, a guard interval, and/or weighted overlap and add (WOLA) symbol extensions. An OFDM demodulator (e.g. DFT) 1303 converts a baseband digital signal into a set of frequency-domain symbols, which represent complex amplitudes of the OFDM subcarriers. An optional demultiplexer 1304 separates the symbols into different layers by subcarrier assignments. An equalizer and/or spatial demultiplexer 1305 may be provided. Spatial demultiplexing may separate layers that are spatially multiplexed onto the same subcarrier sets. The equalizer may perform frequency-domain equalization for each layer, and may follow spatial demultiplexing. One or more pulse-shaping filters 1306 may be employed to effectively perform the complementary or inverse operation of the pulse-shaping filter 803. DFT-s-OFDM de-spreading (e.g., M-point IDFT) 1307 is performed on the symbols, and may demultiplex layers (or data symbols) that were transmitted on different DFT-s-OFDM code spaces. De-spreading 1307 may include (if necessary) covering code despreading or orthogonal matrix despreading, following the DFT-s-OFDM despreading. NOMA (e.g., SCMA or RSMA) decoding 1308 or demodulation is performed on the despread symbols. Decoding 1308 (e.g., MPA decoding) determines the data (or layer identities) transmitted in each code space.

Spreading configuration 1311 may control de-spreading 1307 by inputting code-space parameters (e.g., based on uplink-grant and/or pulse-shape information) for the received signal(s), such as may be received from a scheduler 1316. The spreading configuration 1311 may determine the number of code spaces in an OFDM symbol interval based on the pulse shape of the received signal, and then adapt the code space of the de-spreading 1307. Spreading configuration 1311 may configure the IDFT 1307 to perform demultiplexing and/or multiple-access channelization. Pulse-shaping parameters from the scheduler 1316 may be conveyed to the filter(s) 1306.

FIG. 13 is a block diagram of a signal synthesizer in a wireless device that includes a bit-to-symbol mapper (e.g., a NOMA encoder or QAM modulator) 1401, which outputs data symbols to a waveform modulator 1402. Symbol mapper 1401 (and other encoders 201, 801, 1005) may provide data whitening, such as via a whitening or sphering transformation. The modulator 1402 receives at least one cyclic waveform from a cyclic-waveform synthesizer 1403 and modulates the data symbol(s) thereon to generate a modulated discrete-time signal. Optionally, a cyclic prefix may be appended 1406 to the discrete-time signal, and additional baseband processing 1407 may be performed.

The synthesizer 1403 may generate the cyclic waveforms in real time or retrieve cyclic waveforms stored in memory. The synthesizer 1403 may be communicatively coupled to a scheduler 1431, a pulse shaper 1432, and a code-space mapper 1433. The pulse shaper 1432 and the code-space mapper 1433 are optional components. The scheduler 1431 can be an electronic circuit, software program, subroutine, system component, or device that provides waveform parameters to the synthesizer 1403, such as from uplink grants, or parameter selection made by the wireless device configured for grant-free access.

DFT spreading can be expressed by the following orthogonal matrix:

$$S = \frac{1}{\sqrt{N}}\begin{bmatrix} e^{-\frac{i2\pi 0 \cdot 0}{N}} & e^{-\frac{i2\pi 0 \cdot 1}{N}} & \cdots & e^{-\frac{i2\pi 0 \cdot (N-1)}{N}} \\ e^{-\frac{i2\pi 1 \cdot 0}{N}} & e^{-\frac{i2\pi 1 \cdot 1}{N}} & \cdots & e^{-\frac{i2\pi 1 \cdot (N-1)}{N}} \\ \vdots & \vdots & \ddots & \vdots \\ e^{-\frac{i2\pi(N-1)\cdot 0}{N}} & e^{-\frac{i2\pi(N-1)\cdot 1}{N}} & \cdots & e^{-\frac{i2\pi(N-1)(N-1)}{N}} \end{bmatrix}$$

which may be implemented by employing a fast transform that effectively multiplies a symbol vector x with the DFT spreading matrix S to produce a spread symbol vector y=Sx. The values of y (which may then be pulse shaped to further reduce PAPR) can be mapped to input frequency bins of an oversampled IFFT to produce a discrete-time DFT-s-OFDM signal.

Each column (or row) of matrix S is an orthogonal spreading code. An $n^{th}$ code space comprises at least one spreading code vector, such as:

$$s_n = \frac{1}{\sqrt{N}}\left(e^{-\frac{i2\pi n 0}{N}}, \ e^{-\frac{i2\pi n 1}{N}}, \ \ldots, \ e^{-\frac{i2\pi n (N-1)}{N}}\right)$$

The elements $$e^{-\frac{i2\pi mn}{N}},$$

where m, n=0, ... , (N−1) are the row, column indices of S, indicate that adjacent codes differ from each other by the factor $$e^{-\frac{i2\pi m}{N}}.$$

This phase shift in the frequency domain is transformed by the IDFT into a time shift in the discrete-time signal. For the DFT, this property is:

$$y[m] \leftrightarrow Y[k]$$

$$y[m-d] \leftrightarrow e^{-i2\pi kd/N} Y[k]$$

where Y[k] may be values of the spread symbol vector y (or the pulse-shaped spread symbol vector y), and y[m] are the discrete-time values of the IDFT output. Thus, a delay of d samples in y[m] results from multiplying each frequency-domain value Y[k] by $e^{-i2\pi kd/N}$. However, due to the finiteness of the IDFT in time, the shift in the discrete-time signal y[m] is circular. Thus, a delay of y[m] by d samples also comprises wrapping the last d samples at the end of y[m] to the front of the delayed signal to produce a cyclic-shifted signal. This cyclic shifting of a discrete-time waveform (such as a kernel waveform) can be performed to produce a discrete-time DFT-s-OFDM signal having a desired code space.

FIG. 15A illustrates the real part of a discrete-time waveform of a DFT-s-OFDM signal corresponding to an $n^{th}$ spreading code, $s_n$. In this example, the frequency-domain pulse shape is a Rect function, so the depicted discrete-time waveform is a sinc function. However, other pulse shapes may be used. Orthogonal spreading codes $s_n$ correspond to discrete-time waveforms positioned at intervals that equal the pulse width (e.g., the width of the main lobe of the sinc function as measured between its pair of zero crossings). In this case, discrete-time waveform comprises D samples, and the pulse width comprises d samples.

FIG. 15B illustrates a cyclic shifted version of the discrete-time waveform in FIG. 15A. The first portion 1501 of the waveform (comprising D-d samples) is shifted right by d samples, and the second portion 1502 comprising d samples is appended to the left side of the first waveform 1501. The waveform in FIG. 15B can correspond to a spreading code (e.g., spreading code, $s_{n+1}$) that is orthogonal and adjacent to the spreading code, $s_n$. If this DFT-s-OFDM signal comprises N subcarriers, there can be up to N orthogonal codes.

If an alternative pulse shape is employed, the number of subcarriers and/or the pulse width of the discrete-time waveform may increase, resulting in fewer orthogonal codes than the number of subcarriers. In some aspects, non-orthogonal (e.g., quasi-orthogonal) codes may be employed. In some aspects, spreading codes may be computed for a pulse shape by 1) determining the pulse width of the corresponding discrete-time waveform; 2) based on the pulse-width, determining at least one time offset in the discrete-time waveform to produce a set of orthogonal or quasi-orthogonal spreading codes; and 3) employing the transform property $y[m-d] \leftrightarrow e^{-i2\pi kd/N} Y[k]$ of the time-domain to frequency-domain transform to convert the at least one time offset to compute the set of spreading codes.

In some aspects, a discrete-time waveform (e.g., a kernel) is synthesized 1403 to have a predetermined pulse shape and to comprise a predetermined set of OFDM PRBs, such as from a resource grant or selected using a grant-free access scheme. At least a portion of the subcarriers may overlap PRBs used by another device. Next, the method described above for computing orthogonal or quasi-orthogonal spreading codes may be used to determine the code spaces and cyclic shifts. The kernel may be cyclically shifted by the code-space mapper 1433 according to the code spaces that are selected by, or scheduled to, the wireless device. Data symbols or layer identity symbols may modulated 1402 onto the synthesized waveforms.

In FIG. 14, a kernel-waveform generator 1421 synthesizes a discrete-time kernel that comprises a predetermined pulse shape and a predetermined set of OFDM subcarriers. The discrete-time waveform may comprise in-phase (I) and quadrature (Q) components of a superposition (e.g., sum or aggregate) of the OFDM subcarriers. The kernel may comprise a predetermined code space. The kernel-waveform generator 1421 may receive as input at least one of uplink grant(s), pulse shape(s), code space(s), 5G NR numerology, subcarrier spacing, waveform type, bandwidth per subcarrier, number of subcarriers, and any other parameters, which the generator 1421 converts to physical signal characteristics of the discrete-time waveform. In some aspects, the kernel waveform may be stored in a computer-readable storage medium 1430.

In some aspects, the generator 1421 employs one or more fast transforms and/or one or more matrix-vector multiplications to synthesize the kernel. The generator 1421 may employ a sparse transform and/or a sparse multiplication (e.g., a sparse matrix vector multiplication, a matrix sparse vector multiplication, a matrix sparse matrix multiplication, and permutations and variations thereof). A cyclic shifter 1422 can generate waveforms corresponding to other code spaces by cyclically shifting the kernel. The cyclic shifter 1422 may receive the kernel from the generator 1421, or it may retrieve the kernel from the storage medium 1430.

The cyclic shifter 1422 may generate cyclic-shifted waveforms with code spaces corresponding to different layers or data symbols. For example, the cyclic shifter 1422 or modulator 1402 may determine from encoder 1401 which code spaces to modulate with data symbols. In one aspect, the modulator 1402 selects particular ones of the waveforms to modulate from the storage media 1430, or the modulator 1402 may receive waveforms directly from the cyclic shifter 1422. The modulator 1402 modulates each data symbol onto its selected waveform. The modulated waveforms may be stored in the storage medium 1430. The modulator 1402 may sum multiple modulated waveforms to produce a modulated discrete-time signal.

Code-division duplexing operations may be enabled by flexible symbol configuration in enhanced-NR. Specifically, code spaces in a symbol can be configured as 'DL', 'UL', or 'flexible'. DL transmissions can occur in 'DL' or 'flexible' code spaces, and UL transmissions can occur in 'UL' or 'flexible' code spaces. Cell-specific and UE-specific RRC configurations can determine the UL/DL allocations. Whether a particular code space is used for DL or UL transmission can be dynamically determined according to layer 1/2 signaling of DL control information (e.g., DCI).

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

The invention claimed is:

1. A method for uplink transmission in a wireless communication system, the method comprising:
   receiving, at a User Equipment (UE), a transmission from a network node, the transmission comprising configuration information for frequency domain spectral shaping (FDSS), wherein the configuration information comprises one or more parameters indicative of spectral shaping characteristics;
   generating Discrete Fourier Transform (DFT) spread data symbols from a plurality of data symbols;
   applying a frequency domain window function to the DFT spread data symbols according to the one or more parameters, wherein applying the frequency domain window function modifies spectral characteristics of the DFT spread data symbols to produce modified DFT spread data symbols; and
   employing an inverse fast Fourier transform (IFFT) to transmit the uplink transmission based on the modified DFT spread data symbols.

2. The method of claim 1, wherein the transmission comprising the configuration information is a physical downlink control channel (PDCCH).

3. The method of claim 1, wherein the configuration information is in a downlink control information (DCI) message.

4. The method of claim 1, wherein the configuration information indicates FDSS without spectrum extension.

5. The method of claim 1, wherein the configuration information indicates FDSS with spectrum extension with an amount of excess bandwidth, and generating DFT spread data symbols produces a number of DFT spread data symbols that is greater than the plurality of data symbols, the number of DFT spread data symbols based on the amount of excess bandwidth.

6. The method of claim 1, wherein the configuration information comprises at least one of a pulse shape, a roll-off factor, or a secondary pulse-shaping factor.

7. The method of claim 1, wherein the data symbols comprise reference signals.

8. An apparatus for communication in a wireless communication system, the apparatus comprising:
   control-channel processing circuitry in a User Equipment (UE) configured to receive a transmission from a network node, the transmission comprising configuration information for frequency domain spectral shaping (FDSS), wherein the configuration information comprises one or more parameters indicative of spectral shaping characteristics;
   Discrete Fourier Transform (DFT) circuitry configured to transform a plurality of data symbols into DFT spread data symbols;
   frequency-domain filter circuitry configured to apply a frequency domain window function to the DFT spread data symbols according to the one or more parameters, wherein the frequency domain window function modifies spectral characteristics of the DFT spread data symbols to produce modified DFT spread data symbols; and
   transmission circuitry configured to transmit an uplink transmission based on the modified DFT spread data symbols.

9. The apparatus of claim 8, wherein the transmission comprising the configuration information is a physical downlink control channel (PDCCH).

10. The apparatus of claim 8, wherein the configuration information is in a downlink control information (DCI) message.

11. The apparatus of claim 8, wherein the configuration information indicates FDSS without spectrum extension.

12. The apparatus of claim 8, wherein the configuration information indicates FDSS with spectrum extension with an amount of excess bandwidth, and the DFT circuitry is configured to produce a number of DFT spread data symbols that is greater than the plurality of data symbols, the number of DFT spread data symbols based on the amount of excess bandwidth.

13. The apparatus of claim 8, wherein the configuration information comprises at least one of a pulse shape, a roll-off factor, or a secondary pulse-shaping factor.

14. The apparatus of claim 8, wherein the data symbols comprise reference signals.

15. A User Equipment (UE) for communication in a wireless communication system, the apparatus comprising:
   a control-signal processor configured to receive a transmission from a network node, the transmission comprising configuration information for frequency domain spectral shaping (FDSS), wherein the configuration information comprises one or more parameters indicative of spectral shaping characteristics;
   a Discrete Fourier Transform (DFT) configured to transform a plurality of data symbols into DFT spread data symbols;
   a pulse-shaping filter configured to apply a frequency domain window function to the DFT spread data symbols according to the one or more parameters, wherein the frequency domain window function modifies spectral characteristics of the DFT spread data symbols to produce modified DFT spread data symbols; and an inverse DFT configured to generate an uplink discrete-time signal from the modified DFT spread data symbols.

16. The apparatus of claim 15, wherein the transmission comprising the configuration information is a physical downlink control channel (PDCCH).

17. The apparatus of claim 15, wherein the configuration information is in a downlink control information (DCI) message.

18. The apparatus of claim 15, wherein the configuration information indicates FDSS without spectrum extension.

19. The apparatus of claim 15, wherein the configuration information indicates FDSS with spectrum extension with an amount of excess bandwidth, and the DFT produces a number of DFT spread data symbols that is greater than the plurality of data symbols, the number of DFT spread data symbols based on the amount of excess bandwidth.

20. The apparatus of claim 15, wherein the configuration information comprises at least one of a pulse shape, a roll-off factor, or a secondary pulse-shaping factor.

* * * * *